United States Patent [19]

Park et al.

[11] Patent Number: 4,971,744

[45] Date of Patent: Nov. 20, 1990

[54] TWO-STAGE PROCESS FOR PREPARING AROMATIC POLYAMIDE FILM

[75] Inventors: Ho J. Park, Seoul; Moo S. Rhim, Kumi; Hak M. Kim, Kumi; Du H. Kim, Deagu; Seog O. Yoo, Chunceon; Sang H. Kim, Seoul; Sang B. Park, Gumi; Ink S. Han, Gyungsangbuk; Jong T. Park, Daegu; Si M. Kim, Daegu, all of Rep. of Korea

[73] Assignee: Kolon Industries, Inc., Seoul, Rep. of Korea

[21] Appl. No.: 396,880

[22] Filed: Aug. 21, 1989

Related U.S. Application Data

[63] Continuation-in-part of Ser. No. 24,173, Mar. 10, 1987, Pat. No. 4,876,040.

[30] Foreign Application Priority Data

| May 15, 1986 [KR] | Rep. of Korea | 86-3826 |
| May 15, 1986 [KR] | Rep. of Korea | 86-3827 |
| Jul. 23, 1986 [KR] | Rep. of Korea | 86-5983 |
| Jul. 23, 1986 [KR] | Rep. of Korea | 86-5984 |

[51] Int. Cl.$^5$ .......................................... B29C 71/00
[52] U.S. Cl. ............................... 264/183; 264/184; 264/210.4; 264/210.6; 264/211.18; 264/211.19; 264/212; 264/216; 264/236; 264/347
[58] Field of Search ............... 264/28, 184, 13, 210.8, 264/211.14, 561, 562, 555, 183, 211.16, 236, 347, 14, 141, 180, 181, 210.3, 210.4, 210.6, 211.13, 211.19, 183, 211.18, 212, 216

[56] References Cited

U.S. PATENT DOCUMENTS 4,511,623  4/1985  Yoon et al. .................... 264/184

FOREIGN PATENT DOCUMENTS 59-47694  11/1984  Japan .

OTHER PUBLICATIONS

Journal of Polymer Science; Polymer Physics Edition, vol. 21, 1955–1969 (1983).
Journal of Polymer Science: Polymer Physics Edition, vol. 21, 1957–1983 (1983).

*Primary Examiner*—Hubert C. Lorin
*Attorney, Agent, or Firm*—Finnegan, Henderson, Farabow, Garrett & Dunner

[57] ABSTRACT

A process for preparing aromatic polyamide film wherein an aromatic diamine and an aromatic diacidchloride are dissolved in an amide polymerization solvent containing an inorganic salt, a partial polymerization is effected at a low temperature to form an optically anisotropic liquid crystalline prepolymer dope, continuously extruding through a film die under a draw ratio or subjecting to a shear and contacting the prepolymer with a second solvent which is a polymerization accelerating-precipitation solvent to obtain an aromatic polyamide film free of crystal defect layer perpendicular to the film axis and having high strength and a high degree of molecular orientation.

17 Claims, 10 Drawing Sheets

TWO-STAGE PROCESS FOR PREPARING AROMATIC POLYAMIDE FILM

This application is a Continuation-In-Part of application Ser. No. 07/024,173, filed Mar. 10, 1987, now issued as U.S. Pat. No. 4,876,040 on Oct. 24, 1989.

The present invention relates to a process for preparing aromatic polyamide film, and particularly to the preparation of aromatic polyamide film by a two-stage process.

TECHINICAL BACKGROUND AND PRIOR ART

In the fields of aircraft and aerospace industries, the development of new materials which are very light and yet strong has been requested recently.

Therefore, high strength and high modulus inorganic fibers and film have been developed by using ceramics, graphites or borons and these have been utilized. They have not however been widely applied due to its expensive and difficulty to handle.

On the other hand, aromatic polyamide fibers and film were found to have high strength, high durability to friction and high modulus, and thus the development of the fibers and films has progressed actively.

Also, they have been used as reinforcing materials for plastics in various fields of industry such as the aircraft industry, etc., especially, resin composites reinforced with glass fiber have been used as building materials.

But, there were many problems with the foregoing fibers and films. In an effort to solve the prior problems, West Germay patent laid open No. 1,810,426 to Kwolek discloses a method for increasing the tensile strength and modulus of the fiber.

The method comprises wet-spinning using aromatic polyamide dope having optically anisotropic property, and heating the fiber while applying tension.

Thus, aromatic polyamide Dope was prepared according to the above method, and spun to obtain fibers therefrom. In particular, pulp-like short fibers by the above method were expected to be very widely employed as insulating materials, adiabators, and friction resistant materials in place of asbestos.

As mentioned above, aromatic polyamide fibers, especially pulp-like short fibers having many advantages have been studied and many improvements in their properties made, consequently the following methods have been invented.

That is, according to U.S. Pat. No. 3,869,429 and No. 3,869,430, high molecular weight polymer is obtained by dissolving inorganic salts and aromatic diamines in amide solvents, polymerizing with aromatic diacid chloride at a low temperature to make the polymer of the acid crumb form, and washing to remove the polymerization solvents and inorganic salts, and continuously drying. Liquid crystalline dope is obtained by redissolving the above polymer in 20% by weight sulfuric acid, chlorosulfuric acid or fluorosulfuric acid.

This dope is then spun through a spinning hole to water, neutralized, washed, dried and treated by mechanical processes to prepare the object aromatic polyamide fiber and film. In the application of art, there are many disadvantages in that the process is complicated, and therefore, costly.

The manufacturing apparatus is easily corroded by sulfuric acid, and also the process is somewhat dangerous. Because the polymer decomposes in dope, the property of fibers and film may be reduced.

Moreover, not only it is difficult to handle calcium sulfate ($CaSO_4$), a by-product, but also the color of fibers and film changes with time due to residual sulfuric acid.

The compression strength of the fiber of this method is much weaker than the theoretical value, due to a defect layer in the fiber and film itself, and its chemical resistance is also poor because a crystal defect layer is formed in the fiber and film.

In Japan paten publication So. 59-47694, aromatic polyamides of low molecular weight according to interfacial polymerization are dissolved in an amide solvent, and the resulting solution is mixed with a precipitator and stirred to produce pulp-like particles. In this method, when this polymer is precipitated and stirred in water or alcohol, the inherent viscosity of the fiber reaches about 2 to 3.5 at most. Therefore it is difficult to obtain high quality aromatic polyamide short fibers.

Also, recent art U.S. Pat. No. 4,511,623 discloses a novel method for preparing highly oriented and high strength aromatic polyamide short fibers having an inherent viscosity of 5 to 7. These fibers are prepared by adding tertiary amines like pyridine prior to the polymerization reaction and applying a high mechanical shear rate (160 $cm^{-1}$). At that moment gelation is achieved, hence, rapidly increasing the rate of polymerization and producing a high degree of orientation and polymerization.

But in that case, because the amide solvent and excess tertiary amines are added simultaneously, the viscosity is suddenly increased while polymerization occurs by means of adding terephtaloyl chloride. The polymerization is rapidly terminated within 10 seconds, and then control of the process becomes very difficult. It is impossible to continuously produce fibers.

U.S. Pat. No. 3,672,143 and No. 3,817,941 disclose analogous to the present invention. Those are the methods where the polymerization media as a dope (This dope is In situ polymer dope and is different from Isolated polymer dope.) is spun or ejected by extrusion into a precipitator, and then the object fibers are obtained by said simple process. On the other hand, they have some disadvantages in that it is difficult to increase the molecular weight due to the use of a chain terminator during polymerization and water as a precipitator. Moreover, it is impossible to obtain high quality fibers with an increased molecular weight.

The prior method for preparing aromatic polyamide fibers comprises polymerizing, washing, preparing 20% by weight dope of high molecular weight PPTA (poly-(p-phenylene terephthalamide)) and concentrated sulfuric acid, and spinning into water through an air gap to produce fibers. For instance, this method is based on the principle that the orientation of the molecular chain of the high molecular weight polymer is achieved by drawing during spinning using the foregoing concentrated (20%) solution. And through the molecular chain of the aromatic polyamide is rigid and the polymer forms liquid crystals, the complete orientation of the molecular chain can not be achieved due to the high viscosity of more than 1,000 poise at 80° C.

The resulting aromatic polyamide fibers have microscopic structure of skin(exterior) and core(interior) portion as shown in FIG. 6(a) and FIG. 6(b). The core portion has crystal defect layers every 250 nm perpendicular to the fiber axis and a radially arranged pleated sheet structure, while the skin portion has a compact and well-oriented structure (Ref. Journal of Polymer Science; Polymer Physics Edition, Vol. 21, 1955–1969 (1983)). The fiber strength is considerably lower in comparison with the theoretic strength because of the crystal defect layers perpendicular to the fiber axis of the core portion.

A report in the Journal of Polymer Science; Polymer Physics Edition 21, 1757(1983) discloses a case of spinning after preparing sulfuric acid dope. But in that case, the chain ends of the polymer are ionized to $-NH_3^+$-$HSO_4^-$ and form clusters which comprise the defect layers to the fiber axis. When a force is applied, weak crystal defect layer is formed, hence, chemical and durability decrease. In said paper, it is stated that the strength can be increased by preventing cluster formation, however, it is impossible to attain this by prior arts methods.

In the case of polyethylene (PE), the strength of existing fibers is less than 5 g/d, however, if the molecular chains are extended by a specific spinning known as gel spinning, the strength is increased to at least 20 g/d. And, though chemical structure of two compounds is the same, their properties are remarkably different from each other because of their crystalline structures.

Therefore, the present inventors have concentrated on the foregoing point and have sought to improve the property of aromatic polyamides for a long time.

An object of the present invention is to provide aromatic polyamide fiber and film having high strength and a high degree of orientation by means of separating the "liquid crystalline pre-polymer dope" (LCPD) formation process from the "molecular orientation polymerization" process, permitting the final polymerization and the molecular chain orientation to occur simultaneously in order to overcome the prior disadvantages, including the economic disadvantages of a multistep process, the difficulty of process control due to a sudden increase in the degree of polymerization, the low degree of polymerization, etc.

Another object is to provide a process for the preparation of aromatic polyamide fibers and film in which the manufacturing cost is inexpensive and process control is easy, and the fiber and film can be produced successively and obtained directly at the same time as polyermization.

Another object is to provide aromatic polyamide fibers and film with an inherent viscosity of higher than 3.0, with random distributions of the molecular chain's end, where a crystal defect layer is not formed perpendicular but parallel to the fiber and film axis, and also the color is not changed by aging.

DETAILED DESCRIPTION OF THE INVENTION

Figure 1:
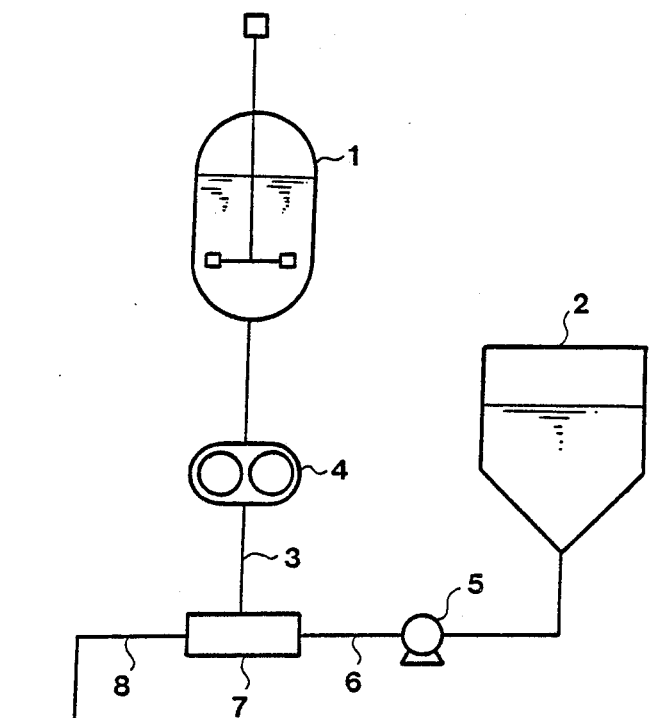
FIG. 1 is a schematic diagram of the manufacturing process according to the first embodiment example of the invention.

In the present invention, aromatic polyamide in the form of fiber are prepared by the following process;

A polymerization solution mixture is prepared by adding equivalent moles of an aromatic diamine and an aromatic diacidchloride reactant to a first solvent, which is an amide polyermization solvent containing an inorganic salt and optionally containing a small amount of tertiary amine, and dissolving diamine and diacidchlorde in the first solvent. Liquid crystalline prepolymer dope(LCPD) is prepared before the polymerization is completely terminated, that is, just before gelation and after stir opalesence occurs during polymeriziation in the form of a copolymer or homo-polymer containing repeating units of one of the following structures(I) or (II), and has an inherent viscosity of 1.0 to 4.0. The above LCPD is spun continuously into a second solvent, which is a polymerization accelerating-precipitation solvent composed of a tertiary amine solvent, a mixture of the tertiary amine and an amide or a mixture of both of the above and an inorganic salt, and wound successively under a spin-stretch factor of 1 to 4, at a temperature of −40° C. to 50° C.

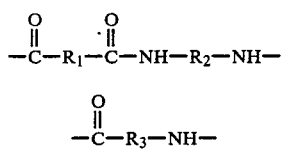

wherein, $R_1$, $R_2$ and $R_3$ are selected from the group consisting of the following radicals and wherein $R_1$ and $R_2$ are the same or different from each other and both present in substantially equivalent moles;

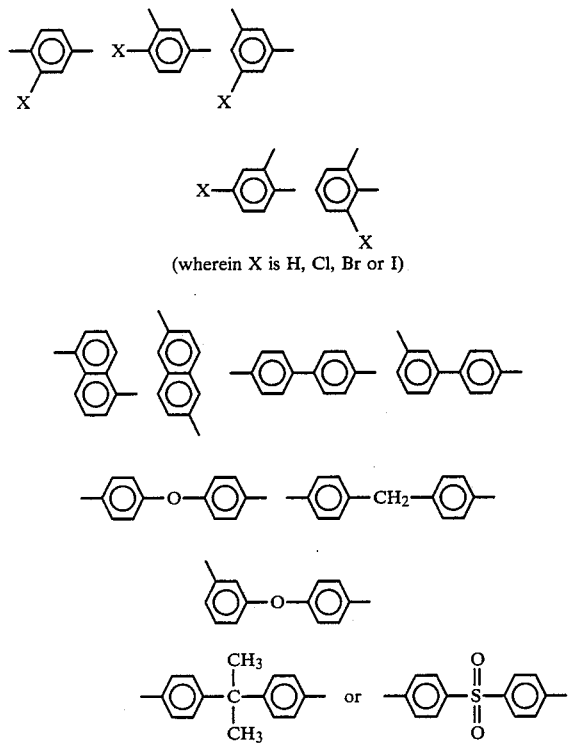

(wherein X is H, Cl, Br or I)

Also, in the present invention, the LCPD having repeating units of one of the above structures (I) or (II) is prepared by the foregoing method. The resulting LCPD is ejected by extrusion with the second solvent. Thus, they are simultaneously contacted with each other and the LCPD is subjected to at least a shear rate 20 sec$^{-1}$ by the second solvent. Therefore, the aromatic polyamide fiber is successively obtained as a pulp-like short fiber.

Meanwhile, in case of the manufacturing process for film, the LCPD is drawn continously into the second solvent and would successively under drawing ratio of 1 to 4, at the same temperature, or the LCPD is subjected to at least a shear rate of 20 sec$^{-1}$ and contacted with the second solvent, As a result, the aromatic polyamide film is successively obtained.

The microscopic structure of the obtained fiber and film is a fully extended chain structure as a result of sufficient molecular orientating polymerization. It has random distributions of molecular chain's in the direction of the fiber axis. Thus, the fibers and film of this invention are free of crystal defect layers such as defect zones caused by NH$_3$+HSO$_4$−ionic clusters. The product was a unique structure characterized as having a high inherent viscosity of at least 3.0 and a high strength of at least 15 g/d.

In this invention, the LCPD is the partially polymerized solution and is formed by dissolving aromatic diamine in the first solvent containing the inorganic salts, and optionally containing a small amount of tertiary amine, cooling in nitrogen, and effecting the solution polymerization with the aromatic diacid chloride at a temperature of less than 40° C. At this time, with a view to obtaining the LCPD of the optional molecular weight to use in the process for the final polymerization, the monomer and solvent should be as pure as possible and the polymerization should occur substantially.

The first solvent, for example, a mixture of organic solvents such as amide or urea and inorganic salts, optionally containing a small amount of tertiary amine may be primarily used. The amide or urea solvents used in the invention include, for example, N-methyl-2-pyrrolidone (NMP), N,N-dimethylacetamide (DMAc), hexamethyl phosphoramide (HMPA), N,N-dimethylformamide (DMF), N,N-dimethylsulfoxide (DMSO), and N,N,N',N'-tetramethylurea(TMU) besides N-methylpiperidone, N-methylcaprolactam, N-acetylpyrrolidine, N-ethylpyrrolidine, N,N-dimethylpropionamide and N,N-dimethylisobutylamide.

The amount of tertiary amine in the first solvent is preferably about 0.01 to 2% by weight of the polymerization solvent. Examples of tertiary amine are pyridine, quinoline, triethylamine, t-butylamine, picoline, pyrimidine, pyrazine, and quinoxaline.

If the amount of tertiary amine in the first solvent is less than 0.01% by weight, the desired effect of tertiary amine addition, namely an increasing polymerization rate, is not achieved. In the case of adding more than 2% by weight, control of the reaction rate becomes difficult, and then process control is not easy.

Inorganic salts are used in order to increase the solubility of the polymer. Preferred inorganic salts include metal halides such as LiCl, CaCl$_2$, KCl, KBr, and LiBr. The amount is preferably 0.5 to 15% by (Weight of salts/volume of amide solvent) of the amide polymerization solvent.

Aromatic diamine such as p-phenylenediamine and aromatic diacid chloride such as terephthaloylchloride are added to the amide solvent containing inorganic salts and optionally a small amount of tertiary amine, and then the resulting mixture is stirred.

Consequently poly (p-phenyleneterephthalamide), represented by following structure (III), is obtained as the LCPD before gelation:

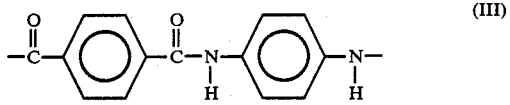

The above LCPD is different from the prior art dope in the form of the isolated polymer dissolved in sulfuric acid in which the isolated polymer dope was prepared by separating the polymer after polymerization, and dissolving it in a solvent such as concentrated sulfuric acid.

The above LCPD in accordance with the present invention has an amount of polymer of 4 to 20% by weight of the LCPD. When the amount is greater than 20% by weight, LCPD is not suitable for use as dope because the reaction rate increases suddenly and consequently process control becomes difficult. On the other hand, in the case of less than 4% by weight, the inherent viscosity of the final polymer decreases remarkably, and the process suffers a loss of cost effectiveness.

In this invention, a suitable inherent viscosity of the polymer of the LCPD ranges from 1.0 and 4.0, preferably from 1.5 to 3.5.

When the amount of polymer or the inherent viscosity are higher than the above suitable ranges, it is difficult to use and to spin or extrude through a nozzle in this invention. In this case of film, it is difficult to feed into a endless belt or extrude through a film die.

The obtained LCPD according to this invention is transferred to a temperature-controlled cylinder equipped with orifices, and spun into the second solvent, which consists of mainly tertiary amines containing less than 5,000 ppm moisture, but, in order to manufacture the film, the LCPD is transferred to the endless belt or film die, and contacted with the second solvent under the same condition. The final polymerization then occurs by means of a molecular orientating polymerization method, and the degree of polymerization is abruptly increased by the tertiary amine solvent. The polymer is wound so as to increase the degree of molecular orientation, continuously washed and dried and then the object polyamide fiber and film may be finally obtained.

In the polymerization system of this invention, all monomers and solvents should contain minimum impurity (moisture), and the quantities should preferably meet the conditions of weight balance. Moreover, it is preferred that the temperature of the tertiary amine solvent or the solvent mixture composed of tertiary amine and amide is to be maintained at low level.

The diameter of the nozzle through which the LCPD is spun is preferably 50 μm to 10,000 μm, and the ratio of tube length to nozzle diameter (L/D) in the spinning-nozzle jet is preferred to be 0.5 to 10. But, the use of a small nozzle promotes penetration by the tertiary amine solvent. Meanwhile, in the film apparatus, the lip gap of film die (or the gap between the belt surface and the knife blade) is preferably 10 μm to 5,000 μm. But, when the gap is smaller, the second solvent is promoted easily to interior of the polymer too. And thus it tends to increase the resultant inherent viscosity ($\eta$inh, I.V.) and the degree of molecular orientation can be easily improved. And also in accordance with adjusting the winding speed or shear rate, the molecular orientation of the polymer can be controlled.

The longer the contact time between LCPD and the second solvent the better, but too long may be impracticable. Therefore, it is preferred that the contact time is within the range of 0.1 to 1,000 sec.

Also, the spinning speed ('JV', the average velocity of LCPD in the tube of the spinning nozzle calculated from the cross sectional area of the orifice and the volume of LCPD passing through the orifice) is 1 m/min to 300 m/min, preferably 50 to 100 m/min. The spin-stretch factor (SSF) refers to the ratio of fiber winding speed to the ejecting speed, and is preferably in the range of 1 to 4.

As well as, in the film process, the drawing factor refers to the ratio of film winding speed to the extruding speed in the film die, and is preferably in the range of 1 to 4. Meanwhile, the shear rate is depended upon the following element; for example, the gap between the Knife blade and the belt surface, supply amount of pre- polymer dope, film width and linear velocity of the endless belt and thus the shear rate is subjected to at least 20 sec$^{-1}$.

The spininning, feeding and extruding process of this invention is usually carried out at a temperature of $-40°$ to 50° C.

In the case where the temperature is lower than $-40°$ C., additional equipment would be required to maintain the temperature, and this causes an increase in manufacturing costs. On the other hand, the case where the temperature is higher than 50° C., results in less molecular orientation.

The process is carried out at a temperature of $-10°$ C. to 45° C. preferably, and more preferably at 0° C. to 25° C. When the fiber and film obtained by the foregoing process is treated with heat under tension, its various properties are improved; for example, the modulus increases 30 to 200% and elongation decreases 30 to 200% of the virgin fiber.

And, the present invention includes the preparation of pulp-like short fibers from fibers in the form of a filament before drying them by means of a known method. Namely the obtained filament fiber or film is transferred to a grinding attachment through a feed roll, and chopped and ground by mechanical treatment, and then the pulp-like short fibers according to the invention are obtained.

The invention also includes a process for directly preparing the pulp-like short fiber by ejection or by contact with the above LCPD having optical anisotropy and the second solvent under a shear rate of at least 20 sec$^{-1}$.

Therefore, the above process for directly preparing the aromatic polyamide pulp-like short fibers and film is illustrated as follows by the enclosed figures.

FIG. 1 is a schematic diagram of the manufacturing process according to the first embodiment of the invention, that is, under the condition that the reaction vessel (1) containing the LCPD as stated above and the storage (2) for storing the second solvent are set up separately. The LCPD in reaction vessel (1) is fed through a transfer line (3) by gear pump (4) to a nozzle jet (7), and simultaneously the solvent in storage (2) is fed though a transfer line (6) by the circulatory pump (5) to a nozzle jet (7). Subsequently the LCPD and the above solvent flow into the nozzle jet (7) and contact each other by ejecting at the same time. As a result molecular orientation and polymerization occurs in the ejection tube (8). Then the flow velocity in the transfer line (6) should be such that it is possible to orient the LCPD flowing the nozzle jet (7), therefore, the flow velocity ration of the LCPD and the second solvent is preferably 1:50 to 1:0.1, more preferably 1:15 to 1:0.2 to remarkably improve process control and various properties of the pulp-like short fibers.

Figure 2:
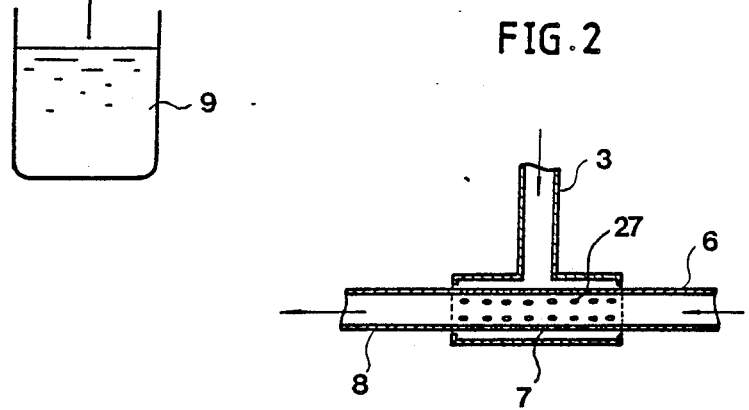
FIG. 2 is an enlarged cross-sectional view of the nozzle jet in FIG. 1.

The diameter of transfer line (3) transferring the LCPD can be 1/16', ⅛', ¼'or ½', and the ejection speed of the LCPD from transfer line (3) is preferably high than 5 m/min. The diameter of the nozzle (27) in the nozzle jet (7) shown in FIG. 2 is preferably 0.006 mm to 1 mm, more preferably 0.01 mm to 0.7 mm, and the number of nozzles (27) ranges from 5 to 500.

And, the above diameter or the number of nozzles are proposed mainly to control the velocity and flow rate in the transfer lines (3 and 6) as well as to improve the degree of orientation or the size of the pulp-like short fiber. Moreover, the nozzle are preferably circular, however, the nozzle are not limited to this shape.

The length of the ejection tube (8) is chosen to allow sufficient time for the molecular orientation of the LCPD by the second solvent. Then pulp-like short fibers of the aromatic polyamide are obtained.

Figure 3:
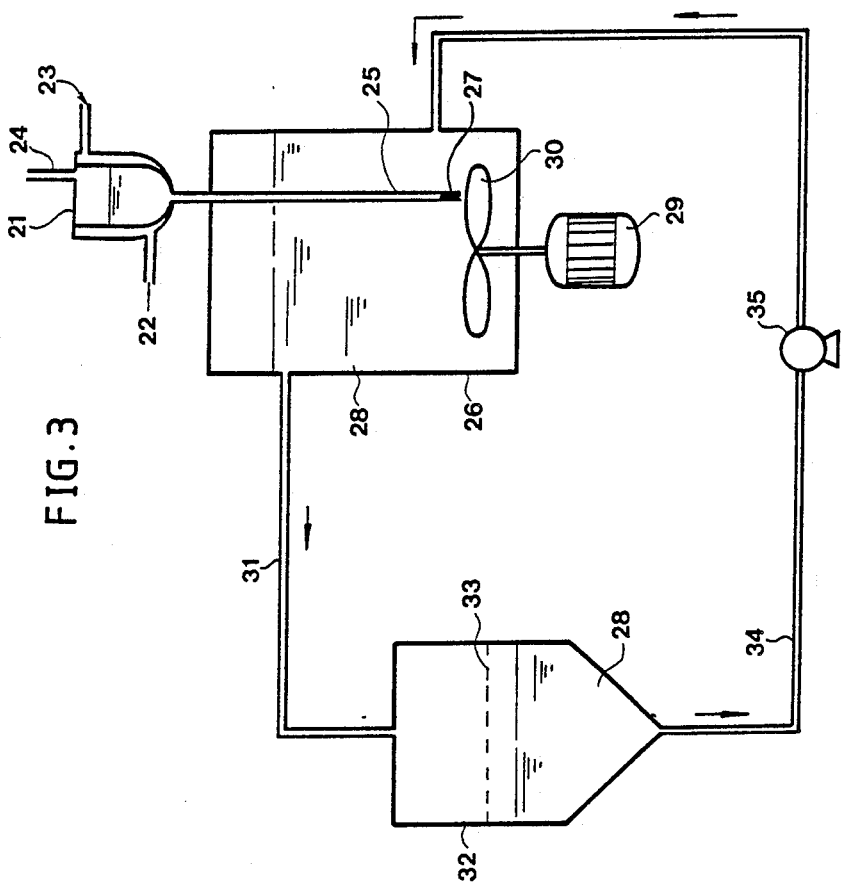
FIG. 3 is a schematic diagram of the process according to the second embodiment example of the invention.

FIG. 3 is the process schematic diagram of the second embodiment of the invention, the LCPD is held in the storage tank (21) maintained at a temperature of less than 30° C. by the circulation of a brine introduced through inlet (22). The exhausted brine is discharged through outlet (23).

A nitrogen pressure of 2 to 20 kg/cm$^2$ is applied to the LCPD in strorage tank (21) through inlet (24). The LCPD passes through a stainless steel ejection tube (25) $\frac{1}{8}''$ in diameter and is fed to the impeller (30). The end of the tube (25) provided with a nozzle (27), that has a diameter less than the diameter of the tube (25). The nozzle (27) has a diameter less than $\frac{1}{8}''$. The LCPD is ejected into the second solvent (28), and is sheared with impeller (30) that is rotated by operating motor (29). The distance between the impeller (30) and the nozzle (27) is preferably less than 2.54 mm in order to increase the shear force and to cause sufficient molecular orientation, as the result of a shear rate of about 20 sec$^{-1}$.

After carrying out the foregoing, the LCPD in a stirrer (26) is polymerized and orientied by the molecular orientation polymerization mothod while being stirred and contacted with the second solvent. It is transferred along the transfer line (31) to the filter (32), and the filter (32) separates the object polymer and the second solvent. The recovered solvent is returned to the stirrer (26) through a circulating tube (34). At this moment, a pump (25) is operated within the compass capable of preventing a backward flow of the second solvent.

The resulting object polymer is obtained as a pulp-like short fiber of the aromatic polyamide by the washing and drying process. The inherent viscosity of the obtained fiber is higher than 3.0.

Figure 4:
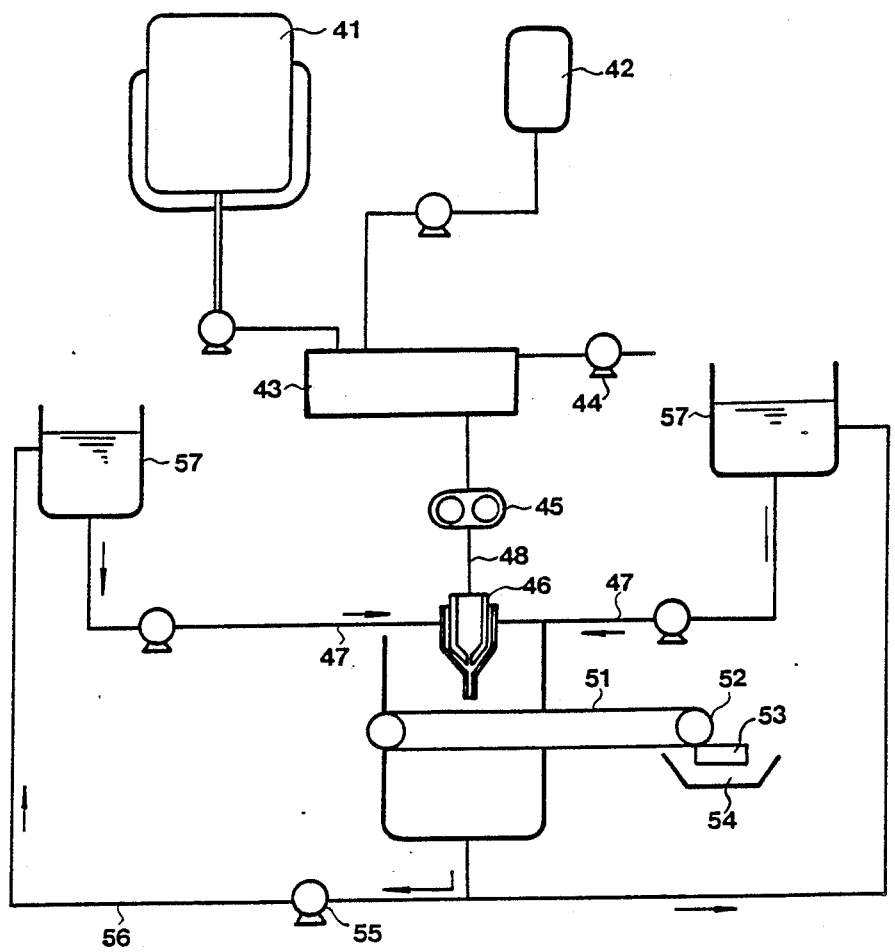
FIG. 4 is a schematic diagram according to the third embodiment example of the invention.

FIG. 4 represents the process of a third embodiment of the invention. The solution completely dissolving the aromatic diamine to the amide solvent containing inorganic salt and optionally containing tertiary amine is in the reaction vessel (41) filled with nitrogen as the first embodiment. The above solution is added to the mixer (43), and the aromatic diacid chloride is simultaneously added to the mixer (43) quantitatively from tank (42).

When the LCPD as in the first embodiment is obtained by the reaction of the above two components in the mixer (43), it is transferred to the ejector (46) at a flow rate controlled by the gear pump (45), just after the removal of gases by a vacuum pump (44).

And the LCPD is contacted in the ejector (46) with the second solvent provided through feed line (47) from storage (57).

Figure 5:
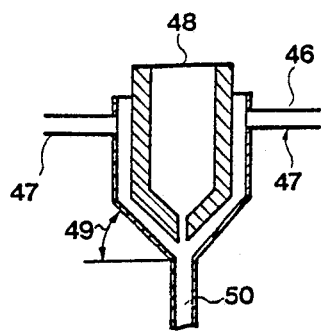
FIG. 5 is an enlarged cross-sectional view of the extrusion apparatus in FIG. 4.

The second solvent flows toward the LCPD provided through the introduction opening (48) at a contact angle (49) as shown in FIG. 5. And they are simultaneously contacted by ejecting through the conflux ejection orifice (50) with a shear rate of at least 20 sec$^{-1}$ as in the first embodiment.

The shape of the conflux ejection orifice (50) is preferably circular. The diameter of the orifice (50) is 0.005 mm to 50 mm. The L/D (the ratio of length to diameter of orifice) of the orifice (50) is preferably in the range of 1 to 10.

The contact angle (49) is preferably the range of 20° to 80°. If it is less than 20°, the effect of molecular orientation increases, but the pulverizing effect decreases. On the other hand, if it is more than 80°, the effect of molecular orientation decreases and the pulverizing effect increases. Therefore, the above two cases are not suitable. More preferable range is 40° to 50°.

It is suitable that the ejection speed is 1 m/min to 300 m/min, and the most preferable length of conflux ejection orifice (50) is 100 mm to 1,000 mm in order to allow the LCPD and the second solvent to make good contact.

The ejected LCPD and second solvent are separated into a solid phase and a liquid phase by the filter conveyor (51), transferred to a roller (52), and the pulp-like short fibers are recovered in the recovery vessel (54) by scrubber (53). At this time, the second solvent is returned to storage (57) of the second solvent tank along recovery line (56) using a pump (55).

Meanwhile, the process for preparing the aromatic polyamide film is illustrated as follows.

Figure 12:
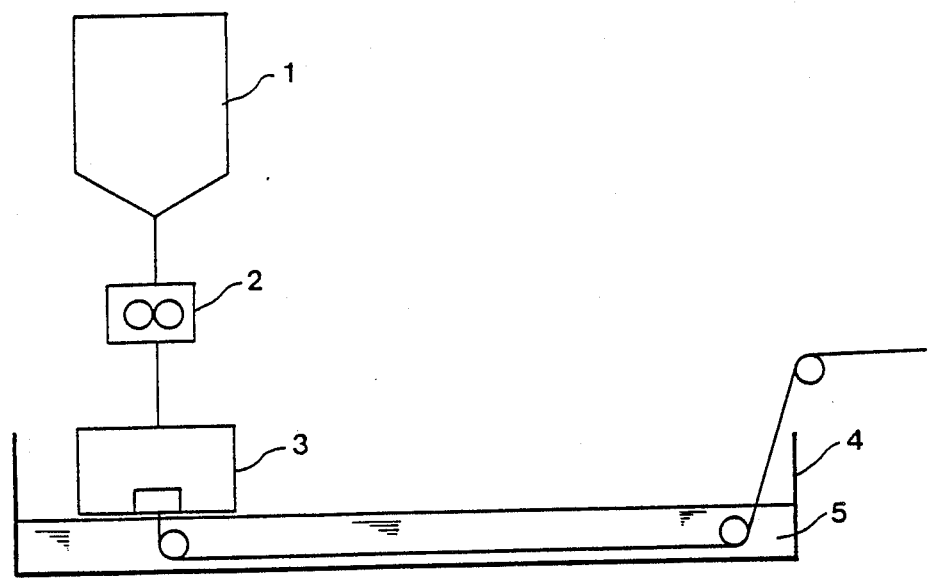
FIG. 12 is a schematic diagram of the film manufacturing process according to the fourth embodiment example of the invention.

FIG. 12 is a schematic diagram of the manufacturing process according to the fourth embodiment of the invention, that is, under the condition that the supply vessel (1) containing the LCPD as stated above and the storage (4) for storing the second solvent are set up separately. The LCPD is fed to the film die (3) by the supply pump (2) and then extruded from the film die (3). And then the pre-oriented LCPD is extruded into the second solvent in the form of film and simultaneously the LCPD is contacted with the second solvent. As a result, polymerization of the LCPD is finished and increased the degree of polymerization and the molecular orientation of LCPD sufficiently occurs.

Figure 13:
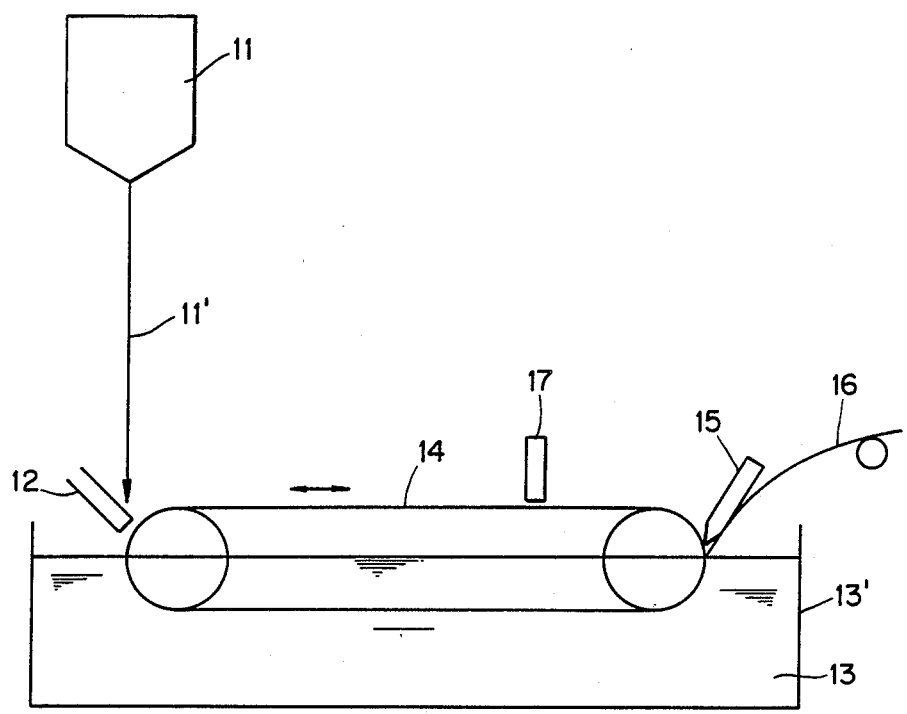
FIG. 13 is a schematic diagram of the film manufacturing process according to the fifth embodiment example of the invention.

FIG. 13 is the process schematic diagram of the fifth embodiment of the invention, that is, under the condition that the supply vessel (11) containing the LCPD as stated above and the storage (13') for storing the second solvent are set up separately. The LCPD in the supply vessel (11) is fed through a supply tube (11') on the surface of the endless belt (14). The supplied LCPD is oriented in the lip gap between the shear knife blade (12) and the endless belt surface and simultaneously the LCPD is coated on the surface of the endless belt (14). After carrying out the forgoing, in the storage (13), the coated LCPD is finally polymerized by the molecular orientation polymerization method which being contacted with the second solvent (13). The obtained polymer in the form of film is separated with the endless belt (14) by means of the knife for film separation. As a result, the resulting object polymer is obtained as the aromatic polamide film by washing and drying after winding process.

In the above process, the second solvent contributes to improvement in the degree of polymerization and the molecular orientation. For instance, the shear force of the solvent may promote formation of hydrogen bonds between the amide bonds. In this invention, the second solvent is preferably a tertiary amine or a mixture of tertiary amine and an amides or a mixture of either of the above and an in organic salt. The suitable amount of amide solvent is 10 to 90% by volume of the tertiary amine solvent.

The tertiary amine is present in an amount more than equivalent to the HCl produced by the reaction of diacid chloride and diamine.

The tertiary amine used in the second solvent to the invention includes, for example, pyridine, t-butylamine, quinoline, picoline, quinuclidine, triethylamine, dimethylethylamine, pyrazine, quinoxaline and pyrimidine. Especially pyridine is an effective solvent to improve the inherent viscosity and the degree of orientation of the fibers and film. Also, suitable amide solvents for the invention include, for example, N-methyl-2-pyrrolidone(NMP), hexamethylphosphoramide(HMPA), N,N-dimethylacetamide(DMAc), N,N-dimethylformamide(DMF), dimethylsulfoxide (DMSO), and N,N,N',N'-tetramethylurea (TMU), N-methylpiperidone, N-methylcaprolactam, N-acetylpyrrolidine, N-ethylpyrrolidine, N,N-dimethylpropionamide and N,N-dimethylisobutylamide, etc. The inorganic salts include, for example, LiCl, CaCl$_2$, KCl, KBr and LiBr. The desirable amount of inorganic salt is 0.01 to 10% by weight of the second solvent.

The process of contacting the LCPD and the second solvent is usually carried out at a temperature of less than 50° C., preferably −40° C. to 50° C. The lower temperature, the better is the molecular orientation effect. However, in the case of a temperature lower than −40° C., additional equipment would be required to maintain the temperature and this causes an increase in manufacturing costs. Moreover, in the case of a temperature of higher than 50° C., the molecular orientation becomes reduced, and, therefore, is not suitable for use in this invention. Therefore, the contact process is preferably carried out at −10° C. to 40° C., and more preferably at 0° C. to 25° C., e.q., room temperature.

Of the pulp-like short fibers and film obtained by the foregoing processes can by heat treatment, these various properties are improved. For example, the modulus increases 30 to 300% and the elongation decreases 30 to 200%.

The properties of the fiber and film according to the invention may be evaluated in terms of their inherent viscosity(I.V.) calculated from the equation;

$$I.V. = \frac{ln(\eta rel)}{C}$$

wherein, $\eta$rel represents relative viscosity; and C represents a concentration of 0.5 g of polymer in 100 ml of sulfuric acid.

The relative viscosity, $\eta$rel is the flow time ratio between a sulfuric acid and a solution of the polymer. Flow times are determined at 30° C. by an ostward capillary viscometer, using mainly concentrated sulfuric acid (95 to 98%) as a solvent.

The present invention remarkably differs from prior art processes as follows:

First, the LCPD (the phase just before gelation and after stir oplaescence occurs during polymerization) is spun into a polymerization accelerating-precipitation solvent under a spin stretch factor of 1 to 4 or it is contacted by ejection with the second solvent, under a shear rate of more than 20 sec$^{-1}$, and then the desired aromatic polyamide fiber having a high strength and a high degree of orientation is obtained by the molecular orientating polymerization method.

Second, in the invention there are two separate processes; namely one for making LCPD and the other for preparing a polymer having a high degree of polymerization with the proper molecular orientation. Especially the following conditions of processing can be freely controlled. For example, the polymer content in the polymerization solvents, the temperature of polymerization, the temperature of contacting the LCPD and the polymerization accelerating-precipitation solvent, etc. Therefore, the polymer of LCPD can maintain an inherent viscosity of 1.0 to 4.0 for 30 minutes and so process control becomes easy.

Third, the inherent viscosity of fiber and film is improved to more than 3.0 by the molecular orientation polymerization method using a tertiary amine solvent or a mixture of a tertiary amine and amide or a mixture of either of the above and inorganic salt, as the polymerization accelerating-precipitation solvent. Moreover, the fiber and film, having high degree of orientation and an extended molecular chain, can be prepared easily because it is possible to accelerate the polymerization rate and the orientation of the molecular chains according to the polymerization accelerating-precipitation solvent by using a low viscosity LCPD.

Fourth, the object fibers can directly be prepared during the polymerization process, without the accompanying processes as follows; separating polymer from the resulting solution, washing, preparing sulfuric acid dope, and spinning. So, the whole process becomes simple and economical, and the fiber is not decolorized, as prior fibers were due to residual sulfuric acid.

Fifth, the size(lenth and diameter), shape, and inherent viscosity of the fiber can be easily controlled by changing the extrusion pressure, the spin-stretch factor, the length of the transfer line, and the diameter of nozzle, etc.

Sixth, there is an additional advantage that the polymerization accelerating-precipitation solvent can be reused provided it has not become contaminated with impurities that affect the degree of polymerization.

Seventh, in the fourth embodiment the LCPD (the phase just before gelation and after stir opalescence occurs during polymerization) is extruded into a polymerization accelerating-polymerization solvent under a drawing ratio of 1 to 4, in the fifth embodiment, it is subjected to the shear rate of more than 20 sec$^{-1}$ and contacted with the second solvent. And then the desired aromatic polyamide film having a high strength and a high degree of orientation is obtained by the molecular orientating polymerization method.

Eighth, the size (thickness and width), shape, and inherent viscosity of the film can be easily controlled by changing the extrusion pressure, the drawing ratio, the speed of the endless belt, the lip gap of film die, etc.

As the result of the foregoing differences in process, the fibers and film produced to the present invention are considerably superior to prior fibers and film as follows.

Figure 6A:
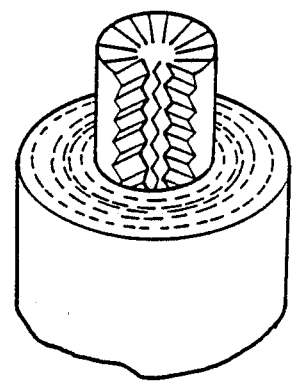
FIG. 6(a) is a partial cross-sectional drawing depicting the structure of the aromatic polyamide fiber according to the prior method.
Figure 6B:
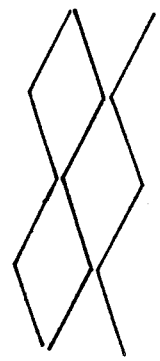
FIG. 6(b) is an enlarged drawing of the core portion having a pleated sheet structure in the aromatic polyamide fiber according to the prior method.
Figure 7:
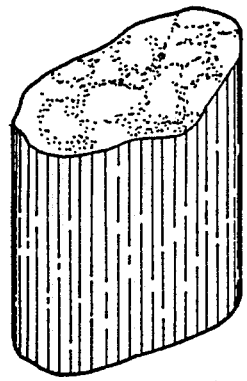
FIG. 7 is a cross-sectional drawing depicting the structure of the aromatic polyamide fiber by the present invention.
Figure 9A:
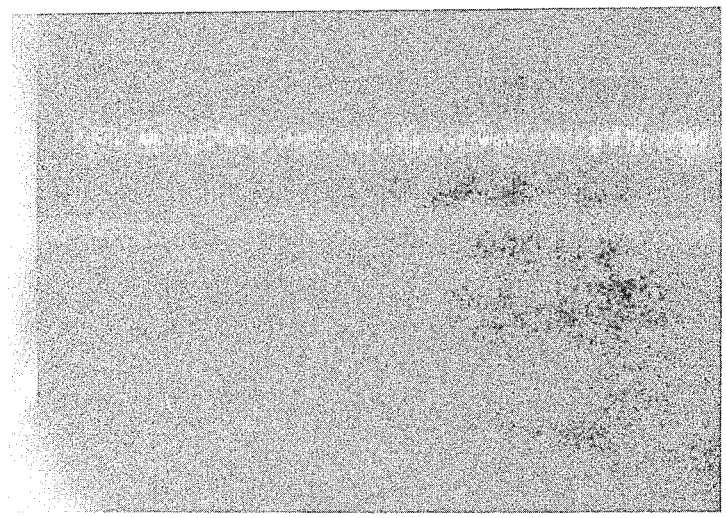
FIG. 9(a) is a picture of the aromatic polyamide fiber of the prior method taken with a polarizing microscope(in this picture, the skin-core and defect layers can be seen)

When a prior aromatic polyamide fiber having a pleated sheet structure like FIG. 6 is examined under a polarizing microscope, transverse bands perpendicular to the axis of fiber are observed at intervals of about 500 to 600 nm, and shown by FIG. 9(a). As a result of the above structural features, the prior fiber has a low strength and modulus, especially has a significantly low compression strength, and then there are many restrictions on its use not only as a substitute material for asbestos or glass fibers but also as reinforcing materials for plastics and rubbers.

Moreover, the molecular chains of prior fibers cannot be fully oriented and have crystal defects, so the fibers are easily dissolved by strong acids such as sulfuric acid, chlorosulfuric acid and fluorosulfuric acid, and also they are easily hydrolyzed by acids or alkalies.

Figure 10A:
FIG. 10(a) is a picture of the prior aromatic polyamide fiber etched with NaOH and taken with an scanning electron microscope (in this picture, the defect layers are etched preferentially by NaOH).

FIG. 10(a) is a picture of a prior aromatic polyamide fiber taken with a SEM after being etched by NaOH or HCl. One can observe that a layer 20 Å in thickness is causes by crystal defect layers which exist along the axis of fiber at regular intervals.

The prior fibers have structure of skin-core portions resulting from an insufficient orientation due to a high viscosity of more than 1,000 poise. Also, they are spun as $H_2SO_4$ PPD-T (about 20%) dope. Therefore, they cannot have sufficient properties as fibers.

Figure 8A:
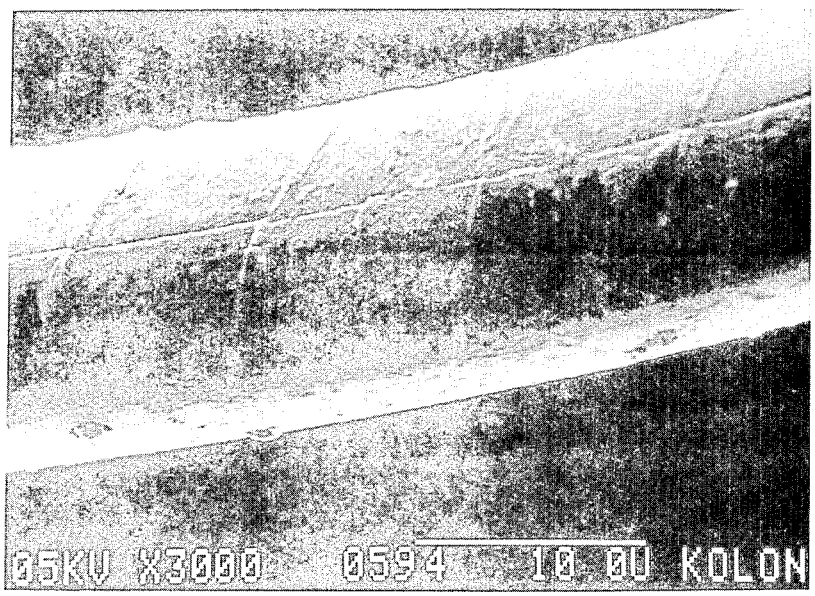
FIG. 8(a) is an enlarged picture of the aromatic polyamide fiber according to the prior method, taken with a scanning electron microscope (in this picture, the defect layers can easily be seen).
Figure 8B:
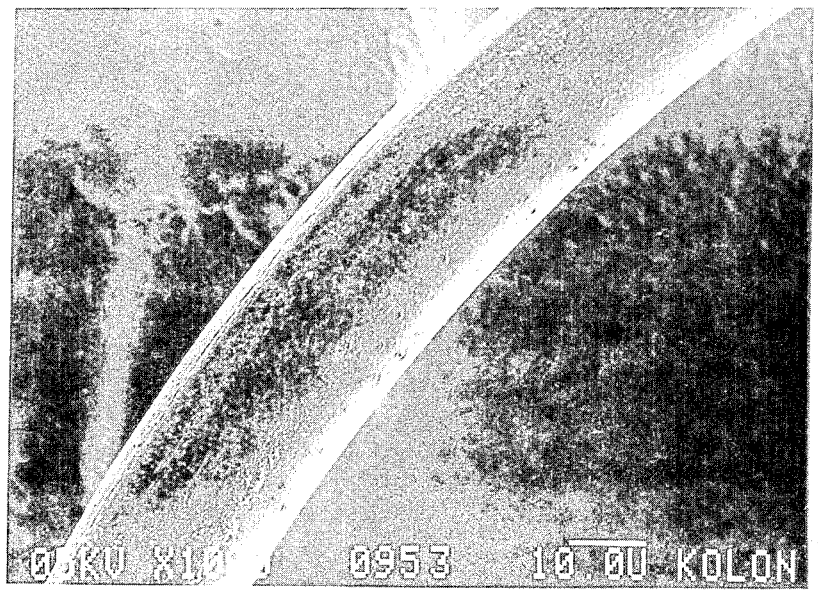
FIG. 8(b) is an enlarged picture of the aromatic polyamide fiber according to the present invention, taken with an scanning electron microscope(in this picture, the defect layers can not be seen).
Figure 9B:
FIG. 9(b) is a picture of the aromatic polyamide fiber (PPD-T) according to the present invention, taken with a polarizing microscope (in this picture, the skin-core and defect layers can't be seen).

On the other hand, in the present invention provides polyamide fibers (PPD-T), in which the preferred molecular orientation is easily achieved because of a low molecular weight of LCPD in spinning stage and the crystal defect layers are randomly distributed. The fiber does not have crystal defect layers as shown by FIG. 8(b) and transverse bands as shown by FIG. 9(b).

Figure 10B:
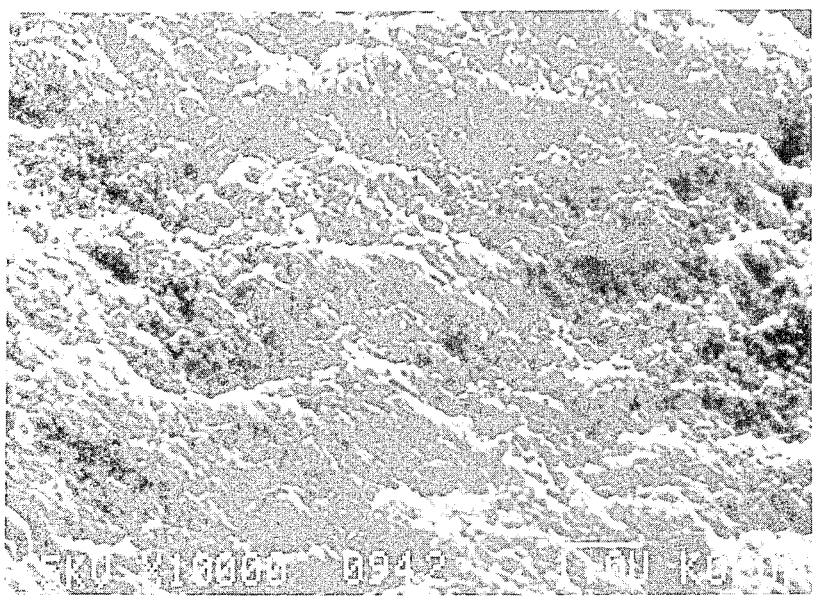
FIG. 10(b) is a picture of the aromatic polyamide fiber according to the present invention, etched with NaOH and taken with a scanning electron microscope (in this picture, the fibers were etched homogeneously by NaOH).
Figure 11A:
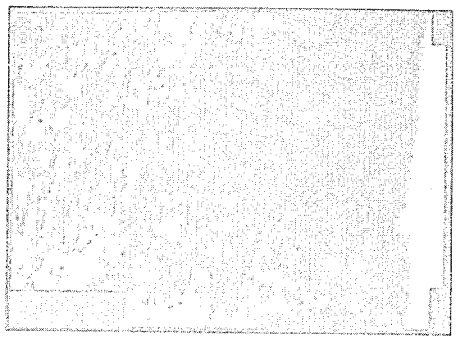
FIG. 11(a) is a picture of prior aromatic polyamide fiber, taken with a transmission electron microscope (this picture shows defect bands perpendicular to the fiber axis).
Figure 11B:
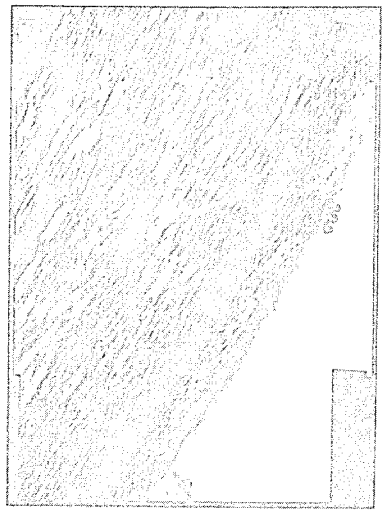
FIG. 11(b) is a picture of the aromatic polyamide fiber according to the present invention, taken with transmission electron microscope (this picture shows no defect bands perpendicular to the fiber axis).

Besides, it does not have the skin-core structure but has a unique structure similar to the skin portion (0.1μ) of the prior fiber, as shown by FIG. 10(b), and the crystal defect layers do not exist with perpendicular to the fiber axis, as shown by FIG. 11(b).

As a Result, the fully extended aromatic polyamide fibers and film can have excellent properties such as strength, modulus and compression strength, as compared with prior fibers.

The properties of the fiber (PPD-T) according to this invention are compared to those of the prior fiber, as the following table:

TABLE

|  | Prior fiber | PPD-T (present invention) | | | | |
|---|---|---|---|---|---|---|
| η inh | 5.3 | 1.5 | 2.0 | 3.0 | 5.3 | 6.2 |
| Tenacity | 22 | 4.5 | 15.2 | 20 | 26 | 31 |
| Elongation (%) | 3–4 | 6 | 6 | 2.1 | 2.1 | 1.0 |
| Modulus (g/d) | 480 | 440 | 510 | 760 | 460 | 520 |

This invention is illustrated by the following Examples, but should not be construed to be limited thereto.

EXAMPLE 1

After a 4-neck flask of 5 l is sufficiently purged with nitrogen gas and then the moisture in the flask is removed as much as possible, 1,200 ml of NMP is introduced into the above flask.

The temperature is raised to 100° C., 27.0 g of $CaCl_2$ is added and completely dissolved into the solution and also 24.5 g of PPD is dissolved sufficiently in the above solution.

45.95 g of TPC is added while cooling the resulting mixture using an ice bath, and stirring well for 15 minutes with a stir speed of 3,000 rpm in order to produce the LCPD.

The resultant obtained the LCPD is transferred to a cylinder equipped with an orifice having 0.5 of L/D and 0.7 mm of diameter. The LCPD is spun into pyridine, and is simultaneously wound at 20 m/min of the wind rate. The wound fiber is washed with water and dried to obtain the object aromatic polyamide fiber having an inherent viscosity (I.V.) of 5.0 and D/E/T-/Mi of 3/7/21/476.

EXAMPLE 2

The processes for preparing aromatic polyamide fiber are carried out as discribed in Example 1 except that polymerization solvent inorganic salts, polymerization accelerating-precipitation solvents and polymerization time are replaced as shown by Table 1.

The resulting I.V. and D/E/T/Mi of the fibers are listed in following Table 1.

TABLE 1

| Exp. No. | Polymerization solvent | Inorganic salt | Precipitation solvent | Polytime (min) | I.V. | D/ E/ T/ Mi |
|---|---|---|---|---|---|---|
| 1 | NMP | $CaCl_2$ | Pyridine (2 L) | 6 | 4.8 | 1.5/3/22/550 |
| 2 | NMP | $CaCl_2$ | Pyridine (1.5 L)/ NMP (0.5L)/$CaCl_2$ (0.01% by weight) | 8 | 5.2 | 2/5/20/450 |
| 3 | NMP | $CaCl_2$ | Py/$CaCl_2$ (5% by weight) | 11 | 6.1 | 2.5/4/19/518 |
| 4 | DMAc | LiCl | Pyridine (2 L) | 7 | 4.9 | 3/3.5/23/560 |
| 5 | DMAc | LiCl | Pyridine (1.5 L)/ DNAc | 7 | 5.0 | 2/4.5/21/530 |
| 6 | DMAc | LiCl | Pyridine/NMP (1.7 L/0.7 L) | 9 | 6.1 | 1.5/4.6/20/485 |
| 7 | DMAc | LiCl | Py/acetone (1.5 L/0.5 L) | 8 | 6.7 | 2.5/6.0/22/478 |

EXAMPLE 3

The processes as described in Example 1 are carried out, except that polymerization solvents and inorganic salts are changed in accordance with Table 2 and pyridine is used as the polymerization accelerating-precipitation solvent.

The results are shown in Table 2.

EXAMPLE 4

The aromatic polyamide fibers are prepared by the same process as in Example 1 except that the polymerization solvent and polymerization accelerating-precipitation solvent are replaced and the L/D and spin stretch factor (SSF) are adjusted in accordance with Table 3.

The results are shown in Table 3.

TABLE 2

| Exp. No. | Polymerization solvent | inorganic salt | I.V. | D/E/T/Mi |
|---|---|---|---|---|
| 1 | NMP/Pyridine (0.5% by weight) | $CaCl_2$ | 5.3 | 1.5/3/20/530 |
| 2 | NMP/Pyridine (1% by weight) | $CaCl_2$ | 5.7 | 1.5/4.5/23/510 |
| 3 | NMP/Pyridine (1% by weight) | $CaCl_2$ | 6.1 | 2/4/10/519 |
| 4 | NMP/Pyridine (2.5% by weight) | $CaCl_2$ | 6.2 | 2.5/3.5/31/525 |
| 5 | DMAc/Pyridine (1% by weight) | LiCl | 5.5 | 2/3.5/23/490 |
| 6 | DMAc/Pyridine (2% by weight) | LiCl | 5.9 | 2.5/3/21/515 |
| 7 | NMP(1080 ml)/ HMPA(120 ml)/Py (1% by weight) | $CaCl_2$ | 6.0 | 3/3.0/24/540 |
| 8 | NMP(1080 ml)/ DMAc (120 ml)/Py (1% by weight) | LiCl | 5.8 | 3/4/20/515 |

TABLE 3

| Exp. No. | Polymerization solvent | Precipitation solvent | L/D | SSF | I.V. | I.V.' (into water) |
|---|---|---|---|---|---|---|
| 1 | NMP | Pyridine (2.5 L) | 0.5 | 2.5 | 6.8 | 2.5 |
| 2 | NMP | Py/NMP (2.2 L/0.3 L) | 0.5 | 2.5 | 6.1 | 2.3 |
| 3 | NMP | Py/NMP (2.0 L/0.5 L) | 1.0 | 2.0 | 5.9 | 2.1 |
| 4 | NMP | Py/CaCl$_2$ (7% by weight) | 1.0 | | 4.5 | 1.8 |
| 5 | DMAc | Pyridine (2.0 L) | 0.5 | 2.5 | 5.4 | 2.0 |
| 6 | DMAc | Py/DMAc (1.8 L/0.2 L) | 0.5 | 2.5 | 6.1 | 2.2 |
| 7 | DMAc | Py/DMAc (1.5 L/0.5 L) | 1.0 | 2.5 | 5.1 | 2.1 |
| 8 | DMAc | Py/LiCl (7% by weight) | 1.0 | 2.5 | 4.8 | 1.9 |

*I.V.' is defined as when the LCPD is spun into water instead of the polymerization accelerating precipitation solvent.

EXAMPLE 5

150 ml of NMP and 50 ml of DMAc are introduced into a dry 1 l 4-neck flask. After dissolving the mixture, 5.4 g of CaCl$_2$ and 4.0 g of PPD are added and completely dissolved. 9.19 g of TPC is added while stirring. The temperature during the polymerization is controlled by circulating cooling water, and is maintained at 40° C.

After the resulting solution is stirred for approximately 20 minutes, the LCPD is spun into pyridine through an orifice having a diameter of 0.6 mm and L/D of 0.8, and is wound with a winding speed of 40 m/min. The resultant fiber is washed with water and dried.

The I.V. of the fiber was 4.0 and D/E/T/Mi of 3/12/21/450.

EXAMPLE 6

The aromatic polyamide fibers are prepared by the same process as in Example 5, except that the polymerization solvent is replaced and SSF and L/D are adjusted in accordance with Table 4.

The results are shown in Table 4.

TABLE 4

| Exp. No. | Polymerization solvent | SSF | L/D | Precipitation solvent | I.V.'s | D/E/T/MI |
|---|---|---|---|---|---|---|
| 1 | NMP (180 ml)/ DMAc (20 ml) | 2.0 | 0.8 | Pyridine | 5.2 | 5/11/18/382 |
| 2 | NMP (100 ml)/ DMAc (100 ml) | 2.0 | 1.0 | Pyridine | 4.8 | 10/15/14/350 |
| 3 | NMP(50 ml)/ DMAc(150 ml) | 2.0 | 1.0 | Pyridine | 6.0 | 3/13/21/451 |
| 4 | NMP(180 ml)/ HMPA (20 ml) | 2.5 | 0.5 | Pyridine | 7.1 | 7/9/17/400 |
| 5 | NMP (150 ml)/ HMPA (50 ml) | 2.5 | 0.5 | Pyridine | 4.7 | 4/10/21/340 |
| 6 | NMP (100 ml)/ HMPA (100 ml) | 2.5 | 1.0 | Pyridine | 5.4 | 2/13/23/500 |
| 7 | NMP (50 ml)/ HMPA (150 ml) | 2.5 | 1.0 | Pyridine | 4.8 | 5/16/17/350 |

EXAMPLE 7

The aromatic polyamide fibers are prepared by the same process as in Example 5, except that the polymerization solvent, L/D, SSF and polymerization accelerating-precipitation solvent are substituted as in accordance with Table 5.

The results are shown in Table 5.

TABLE 5

| Exp. No. | Polymerization solvent | L/D | SSF | Precipitation solvent | I.V.'s | I.V.' (into water) |
|---|---|---|---|---|---|---|
| 1 | NMP (10 ml)/ DMAc (50 ml) | 0.5 | 2.0 | Pyridine (250 ml) | 4.9 | 2.3 |
| 2 | NMP (100 ml)/ DMAc (100 ml) | 0.5 | 2.0 | Pyridine (200 ml)/ NMP (50 ml) | 4.6 | 2.0 |
| 3 | NMP (80 ml)/ HMPA (70 ml) | 0.5 | 3.0 | Pyridine (300 ml) | 5.0 | 2.1 |
| 4 | NMP (50 ml)/ HMPA (100 ml) | 0.5 | 5.0 | Pyridine (282 ml)/ NMP (18 ml) | 5.4 | 2.1 |
| 5 | DMAc (100 ml)/ HMPA (50 ml) | 0.5 | 5.0 | Pyridine (300 ml) | 5.4 | 2.2 |
| 6 | DMAc (30 ml)/ HMPA (120 ml) | 0.5 | 5.0 | Pyridine (200 ml)/ DMAc (100 ml) | 5.2 | 2.3 |

EXAMPLE 8

After 5.4 g of CaCl$_2$ is dissolved in 200 ml of DMAc, 4.9 g of PPD is added and stirred for about 5 minutes.

9.19 g of TPC is added and allowed to polymerize. At that time, the temperature is maintained at 10° C. by cooling water while stirring for 10 minutes. The resulting LCPD is spun into pyridine through an orifice having a diameter of 0.7 mm and an L/D of 2, and wound at with a winding speed of 30 m/min.

The resultant fiber is washed with water and dried.

The fiber has an I.V. of 4.0 and D/E/T/Mi of 31/1.5/22/450.

EXAMPLE 9

After 3.82 g of LiCl is added and dissolved in 200 ml of DMAc, 4.1 g of PPD is dissolved in the mixture while stirring. 7.66 g of TPC is added and allowed to polymerize. The polymerization reaction is carried out at a temperature of 40° C. which is controlled with cooling water.

The above LCPD is allowed to react for 20 minutes and is then introduced into a cylinder equipped with an orifice having diameter of 0.5 mm and L/D of 0.5, and spun into pyridine.

The spun fiber is wound with a winding speed of 30 m/min, and the fiber is washed with water and dried. The fiber has an I.V. of 4.3 and D/E/T/Mi of 5/11/19/450.

EXAMPLE 10

The fibers are prepared as the same prcess as in Example 9 except that a number of conditions including the polymerization solvent, L/D, SSF and polymerization accelerating-precipitation solvent are changed in accordance with Table 6.

The results are shown in Table 6.

TABLE 6

| Exp. No. | Polymerization solvent | L/D | SSF | Precipitation solvent | I.V.'s | D/E/T/Mi |
|---|---|---|---|---|---|---|
| 1 | NMP (250 ml) | 0.5 | 2.0 | Pyridine (300 ml) | 4.3 | 3/13/21/473 |
| 2 | " | " | 3.0 | Pyridine (250 ml)/ NMP (50 ml) | 4.8 | 10/15/17/350 |
| 3 | NMP (150 ml)/ DMAc (50 ml) | " | 1.0 | Pyridine (300 ml)/ CaCl$_2$ (1% by weight) | 5.1 | 2/12/20/470 |
| 4 | " | " | " | Pyridine (200 ml)/ DMAc (100 ml) | 4.9 | 4/10/19/410 |
| 5 | NMP (170 ml)/ HMPA (30 ml) | 1.0 | 3.0 | Pyridine (300 ml) | 5.7 | 2/20/19/395 |
| 6 | NMP (100 ml)/ HMPA (100 ml) | 1.0 | 3.0 | Pyridine (250 ml )/ NMP (50 ml) | 4.9 | 5/13/20/441 |
| 7 | DMAc (150 ml) HMPA (50 ml) | " | 2.0 | Pyridine (300 ml) | 5.2 | 7/18/16/400 |
| 8 | DMAc (50 ml) HMPA (150 ml) | 1.0 | 3.0 | Pyridine (230 ml)/ HMPA (70 ml) | 5.1 | 6/11/20/370 |

COMPARATIVE EXAMPLE 1

The fibers are prepared by the same process as in Example 11 except that the resultant LCPD is spun into water.

The I.V. of resulting fibers were compared with those of fibers according to Example 11, and the results are shown in Table 7.

TABLE 7

| Exp. No. | I.V. (Pyridine/amide solvent) | I.V.'s (Water) |
|---|---|---|
| 1 | 4.3 | 1.7 |
| 2 | 4.8 | 1.8 |
| 3 | 5.1 | 2.3 |
| 4 | 4.9 | 2.1 |
| 5 | 5.7 | 2.7 |
| 6 | 4.9 | 2.2 |
| 7 | 5.2 | 2.4 |

TABLE 7-continued

| Exp. No. | I.V. (Pyridine/amide solvent) | I.V.'s (Water) |
|---|---|---|
| 8 | 5.1 | 2.3 |

EXAMPLE 11

After 2.16 g of PPD and 5.05 g of 3.4-diaminodiphenylether are dissolved in a solution of 5.4 g of CaCl$_2$ dissolved in 200 ml of NMP, 9.19 g of TPC is added and polymerized for 10 minutes, at a low temperature.

The resulting LCPD are spun into pyridine through an orifice having a diameter of 0.3 mm and L/D of at a winding speed of 50 m/min. The resultant fibers were washed with water and dried.

The fiber has an I.V. of 5.6.

EXAMPLE 12

After 5.4 g of CaCl$_2$ and 4.90 g of PPD; are dissolved in a mixed solvent of 100 ml NMP and 100 ml HMPA, 9.19 g of TPC is added and cooled while stirring. After stirring for 30 minutes, the resulting LCPD is spun into a mixed solvent of pyridine/HMPA (80 parts by weight/20 parts by weight) through an orifice under the same conditions as in Example 11. The spun fiber is wound, washed with water and dried.

The fiber showed I.V. of 4.6 and T/E/Mi/Den of 7/10/400/3.

EXAMPLE 13

This example is the first embodiment describing the process for directly preparing aromatic polyamide pulp-like short fibers by means of extrusion-ejection.

The reaction vessel is sufficiently purged with nitrogen gas and moisture in the vessel is removed completely. 250 ml of NMP, the amide solvent, is introduced into the vessel and the temperature is increased to 80° C. After that, 10.0 g of CaCl$_2$ is also added and stirred for 30 minutes in order to dissolve it.

After preparation of the amide polymerization solvent containing inorganic salt according to the forgoing process, 10.38 g of PPD is added and dissolved while stirring for 10 minutes, and 19.55 g of TPC is also added and simultaneously stirred vigorously while maintaining a temperature of 30° C.

After stirring for 8 minutes, the resulting LCPD is transferred to the nozzle jet apparatus through a transfer line having a diameter of ⅛ inch, by the operating gear pump. Then, the diameter of nozzle is 0.3 mm, there are 15 nozzles and the gear pump is operated at pressure of 3 Kg/cm².

Just after the above LCPD begin to be extruded into the nozzle jet, pyridine(water content is less than 1,000 ppm) in storage of the polymerization accelerating-precipitation solvent is extruded through transfer line of ¼ inch diameter into the nozzle jet by the operating transfer pump which provides a pressure of 0.3 Kg/cm².

In the nozzle jet, the LCPD come into contact with pyridine at 20° C., and then they are simultaneously ejected by extrusion through an ejection tube that ¼ inch in diameter and 4 m in length.

The resulting pulp-like particles and pyridine solvent are separated by filtration. Then, the pyridine filterate is recirculated, and the resultant fibers are dried for 5 hours in a vacuum drier maintained at 110° C.

The inherent viscosity of the pulp-like short fibers is 4.03.

EXAMPLE 14

The process is the same as in Example 13, but the I.V. of the polymer of the LCPD is changed according to Table 8.

The altered I.V.'s of the resultant pulp-like short fibers are shown in Table 8.

TABLE 8

| Exp. No. | I.V. of the polymer of the LCPD | I.V. of resultant pulp-like short fiber |
|---|---|---|
| 1 | 2.37 | 4.53 |
| 2 | 2.79 | 5.39 |
| 3 | 3.04 | 6.01 |
| 4 | 3.27 | 5.74 |
| 5 | 3.65 | 5.21 |
| 6 | 3.97 | 5.50 |

EXAMPLE 15

In this example, the object fibers are prepared by the same process as in Example 13 except that the mixed solvents, pyridine and amides, shown in Table 9, are used as polymerization accelerating-precipitation solvent and the transfer pressure is adjusted to 0.5 Kg/cm².

The I.V. of the polymer of the LCPD and the resultant pulp-like short fibers are shown in Table 9.

TABLE 9

| Exp. No. | Precipitation solvent | I.V. of the polymer of the LCPD | I.V. of resultant pulp-like short fibers |
|---|---|---|---|
| 1 | Pyridine 90 parts/ NMP 10 parts | 2.37 | 5.84 |
| 2 | pyridine 70 parts/ NMP 30 parts | 2.63 | 5.31 |
| 3 | pyridine 50 parts/ NMP 50 parts | 2.45 | 5.12 |
| 4 | pyridine 30 parts/ NMP 70 parts/ CaCl₂ 8% by weight | 3.04 | 6.30 |
| 5 | pyridine 6 parts/ NMP 94 parts | 3.71 | 4.80 |
| 6 | pyridine 50 parts/ DMAc 50 parts | 2.46 | 5.31 |
| 7 | pyridine 70 parts/ HYMA 30 parts | 2.95 | 5.59 |
| 8 | pyridine 50 parts/ HMPA 50 parts | 3.43 | 6.13 |

EXAMPLE 16

The object pulp-like short fibers are prepared by the same process as in Example 13 except that a tertiary amine is used as shown in the Table 10.

In this case, the I.V.'s of the polymer of the LCPD is 2.71.

TABLE 10

| Exp. No | Precipitation solvent | I.V.'s of resultant pulp-like sport fibers |
|---|---|---|
| 1 | triethyamine | 4.3 |
| 2 | t-butylamine | 5.47 |
| 3 | dimethylethylamine | 4.1 |

EXAMPLE 17

In this example, the process having the same reaction conditions as in Example 13 is carried out, but the extrusion speeds of the LCPD and pyridine are changed as shown in Table 11.

According to this example, the I.V.'s of the polymer of the LCPD and resultant pulp-like short fibers are seen in Table 11.

The diameter of the nozzle is 0.5 mm.

TABLE 11

| Exp. No. | Speed of LCPD (m/min) | Speed of pyridine (m/min) | I.V. of the polymer of the LCPD | I.V. of resultant pulp-like short fiber |
|---|---|---|---|---|
| 1 | 2 | 10 | 2.73 | 4.70 |
| 2 | 2 | 12 | 2.73 | 4.80 |
| 3 | 2 | 20 | 2.73 | 5.81 |
| 4 | 4 | 20 | 2.59 | 5.53 |
| 5 | 4 | 50 | 2.59 | 4.76 |
| 6 | 10 | 50 | 3.12 | 6.34 |
| 7 | 10 | 30 | 3.12 | 6.91 |
| 8 | 15 | 35 | 2.95 | 6.07 |
| 9 | 15 | 50 | 2.95 | 5.91 |
| 10 | 20 | 50 | 3.46 | 6.63 |
| 11 | 25 | 70 | 3.46 | 5.74 |
| 12 | 30 | 70 | 3.46 | 6.41 |
| 13 | 40 | 100 | 3.77 | 7.14 |
| 14 | 50 | 130 | 3.77 | 6.91 |

EXAMPLE 18

The pressure of the gear pump is adjusted to 5 Kg/cm² and the pressure of circulatory pump is adjusted to 0.7 Kg/cm². Also the I.V. of the polymer of the LCPD, diameter and number of nozzles are changed as described in Table 12.

Except for these mentioned above all of the reaction conditions are the same as those in Example 13.

The I.V. of the object pulp-like short fibers are as listed in Table 12.

EXAMPLE 19

In this example, the processes are carried out as in Example 13 except that the I.V. of the polymer of the LCPD and the length of ejection tube are altered as shown in Table 13. At that time, the diameter and number of nozzles are 0.5 mm and 15, the pressure applied to the LCPD is 5 Kg/cm², and the pressure of pyridine is 0.7 Kg/cm².

The I.V.'s of the resultant pulp-like short fibers are shown in Table 13.

TABLE 12

| Exp. No. | Diameter of nozzle (mm) | Number of nozzles | I. V. of the polymer of the LCPD | I. V. of pulp-like short fiber |
|---|---|---|---|---|
| 1 | 0.1 | 10 | 3.17 | 5.73 |
| 2 | 0.3 | 5 | 2.74 | 5.03 |
| 3 | 0.3 | 20 | 2.69 | 4.85 |
| 4 | 0.5 | 10 | 3.25 | 5.97 |
| 5 | 0.5 | 20 | 3.47 | 6.34 |
| 6 | 0.5 | 30 | 3.36 | 6.59 |
| 7 | 0.5 | 40 | 2.94 | 6.04 |
| 8 | 0.7 | 5 | 2.61 | 5.83 |
| 9 | 0.7 | 15 | 3.54 | 6.14 |
| 10 | 0.7 | 25 | 3.04 | 6.36 |
| 11 | 0.7 | 35 | 2.79 | 5.83 |
| 12 | 1.0 | 5 | 2.91 | 6.09 |
| 13 | 1.0 | 10 | 3.30 | 6.31 |
| 14 | 1.0 | 20 | 3.08 | 6.25 |

TABLE 13

| Exp. No. | Length of ejection tube (m) | I. V. of the polymer of the LCPD | I. V. of resultant pulp-like short fiber |
|---|---|---|---|
| 1 | 5 | 2.07 | 5.09 |
| 2 | 7 | 3.28 | 6.73 |
| 3 | 10 | 2.73 | 5.13 |
| 4 | 20 | 2.91 | 6.27 |
| 5 | 30 | 3.15 | 6.47 |
| 6 | 40 | 2.36 | 6.43 |
| 7 | 50 | 2.38 | 6.27 |

EXAMPLE 20

The processes are carried out under the same conditions as in Example 13, except that a mixture of NMP and HMPA or DMAc alone or a mixture of DMAc and HMPA are used instead of NMP. When the solvent is a mixture of NMP and HMPA, 10.0 g of $CaCl_2$ is used as inorgainc salt, as in Example 14. When the solvent is DMAc alone or a mixture of DMAc and HMPA, 10.0 g of LiCl is used.

The obtained LCPD and the resultant pulp-like short fibers, according to this example, have I.V.'s as the following table 14.

In this example, the condition of nozzles and the pressures of the LCPD and pyridine are equal to the foregoing Example 20.

TABLE 14

| Exp. No. | Polymerization solvent | I. V. of the polymer of the LCPD | I. V. of pulp-like short fiber |
|---|---|---|---|
| 1 | NMP (175 ml) + HMPA (75 ml) | 2.14 | 5.41 |
| 2 | NMP (125 ml) + HMPA (125 ml) | 1.96 | 4.97 |
| 3 | DMAc (250 ml) | 2.21 | 5.58 |
| 4 | DMAc (175 ml) + HMPA (75 ml) | 2.18 | 4.01 |
| 5 | DMAc (125 ml) + HMPA (125 ml) | 2.09 | 4.78 |

EXAMPLE 21

The processes are carried out under the same conditions as in Example 13, except that the monomers (aromatic diamine and aromatic diacid chloride) are replaced according to Table 15. When using 3,4'-diaminodiphenylether as a monomer, the monomers are preferably 25 mole % p-phenylenediamine, 50 mole % teraphtaloylchloride, and 25 mole % 3,4'-diaminodiphenylether.

At that time, the diameter and number of nozzles are 0.7 mm and 15, and the pressures of the LCPD and pyridine are 4 Kg/cm² and 0.5 Kg/cm².

As a result, the I.V. of the polymer of the LCPD and the resultant pulp-like short fibers is listed in Table 15.

TABLE 15

| Exp. No. | Monomer | I. V. of the polymer of the LCPD | I. V. of resultant pulp-like short fiber |
|---|---|---|---|
| 1 | chloro-p-phenylene diamine/terephthaloylchloride (TPC) | 1.93 | 4.46 |
| 2 | 4,4'-diaminodiphenyl methane/TPC | 2.19 | 4.89 |
| 3 | PPD/2,6-naphthalene dicarboxylic acid chloride | 1.86 | 4.83 |
| 4 | 4,4'-diaminodiphenyl sulfone/TPC | 2.04 | 5.03 |
| 5 | PPD/3,4'-diaminodiphenylether | 1.97 | 4.68 |

EXAMPLE 22

The processes are carried out under the same conditions as in Example 13, except that amide solvent containing a small amount of amine (namely, pyridine) are used as polymerization solvents. At that time, the composition of the polymerization solvent and the inorganic salts are changed as shown in Table 16.

The results are listed in Table 16.

COMPARATIVE EXAMPLE 2

In this comparative example, water is used instead of polymerization accelerating-precipitation solvent, as in prior arts.

The I.V.'s of the polymer of the LCPD and the resultant pulplike short fibers are shown in Table 17.

TABLE 16

| Exp. No. | Polymerization solvent | Inorganic salt | I. V. of the polymer of the LCPD | I. V. of resultant pulp-like short fiber |
|---|---|---|---|---|
| 1 | NMP/Pyridine (0.5% by weight) | $CaCl_2$ | 2.24 | 5.73 |
| 2 | NMP/Pyridine (1% by weight) | $CaCl_2$ | 2.36 | 5.79 |
| 3 | NMP/Pyridine 2% by weight) | $CaCl_2$ | 2.51 | 6.02 |
| 4 | NMP/Pyridine (2.5% by weight) | $CaCl_2$ | 2.53 | 6.24 |
| 5 | DMAc/Pyridine (0.5% by weight) | LiCl | 2.37 | 5.93 |
| 6 | DMAc/Pyridine (1% by weight) | LiCl | 2.43 | 5.94 |
| 7 | DMAc/Pyridine (2% by weight) | LiCl | 2.49 | 6.03 |
| 8 | NMP (70%)/ HMPA (30%) /Pyridine (1% by weight) | $CaCl_2$ | 2.35 | 5.84 |

TABLE 17

| I. V of the polymer of the LCPD | I. V of resultant pulp-like short fiber |
|---|---|
| 2.1 | 2.13 |
| 2.37 | 2.29 |
| 3.04 | 3.16 |
| 3.65 | 3.83 |
| 3.97 | 3.95 |

EXAMPLE 23 (COMPARATIVE EXAMPLE 3)

This example is the second embodiment describing the process for directly preparing aromatic polyamide pulp-like short fibers.

Preparation of the LCPD is according to the process of Example 13 by using 240 ml of NMP, 7.2 g of $CaCl_2$, 6.53 g of PPD and 12.26 g of TPC. The resultant LCPD are transferred into dope storage, maintainied at a low temperature by cooling water, and ejected through ⅛ inch stainless steel tube into pyridine at 0° C. and 3 $Kg/cm^2$ nitrogen pressure, while stirring. The impeller has a widths of 1.2 cm a diameter of 6.5 cm and revolves at a rate of 1,500 rpm. The distance between the impeller and the end of ejection tube is approximately 1.0 mm.

In order to examine the effect of pyridine, the LCPD are also ejected into both water and a 6% $NaHCO_3$ aqueous solution.

After that, the above resultant polymers are washed with water and dried under vaccum, at 110° C. for 6 hours.

The resultant polymers has I.V.'s as listed in Table 18.

TABLE 18

| Precipitation solvent | I. V. |
| --- | --- |
| water | 2.36 |
| 6% $NaHCO_3$ | 2.37 |
| Pyridine | 5.62 |

EXAMPLE 24 (COMPARATIVE EXAMPLE 4)

In this example, the same process as in the foregoing Example 23, is carried out, but the polymerization time after adding TPC, the size and shape of the ejection tube, the stir rate during extrusion, and the polymerization accelerating-precipitaion solvent are changed as shown in Table 19.

Simultaneously, another process using water as the precipitation solvent is carried out also.

The measured I.V.'s of the resultant pulp-like short fibers are listed in Table 19.

EXAMPLE 25 (COMPARATIVE EXAMPLE 5)

The pulp-like short fiber is prepared by the same process as in Example 23 except that polymerization time, stir rate, and polymerization accelerating-precipitation solvent are replaced as shown in Table 20.

The mixture of amine and pyridine is used as the polymerization accelerating-precipitation solvent. As a Comparative example, water is also used as precipitation solvent, in place of the above mixture.

Consequently, the resultant short fibers has I.V. as shown Table 20.

TABLE 19

| Exp. No. | Polymerization time (min) | Size and shape of discharge | Stirring rate (rpm) | Precipitation solvent | I.V.'s |
| --- | --- | --- | --- | --- | --- |
| 1 | 15 | ⅛ inch (1 hole) | 1500 | water | 1.90 |
|   |    |                 |      | pyridine | 4.33 |
| 2 | 17 | ⅛ inch (1 hole) | 3000 | water | 3.20 |
|   |    |                 |      | pyridine | 5.81 |
| 3 | 10 | ⅛ inch (1 hole) | 1750 | water | 1.95 |
|   |    |                 |      | pyridine | 5.58 |
| 4 | 13 | 0.1 mm (3 hole) | 3000 | water | 1.85 |
|   |    |                 |      | pyridine/$CaCl_2$ (7% by weight) | 6.48 |
| 5 | 13 | 0.1 mm (3 hole) | 3000 | water | 2.29 |
|   |    |                 |      | Pyridine | 7.10 |
| 6 | 12 | 0.1 mm (3 hole) | 3000 | water | 3.43 |
|   |    |                 |      | Pyridine | 6.01 |

TABLE 20

| Exp. No. | Polymerization time (min) | Stiring rate (rpm) | Precipitation solvent | I. V. |
| --- | --- | --- | --- | --- |
| 1 | 15 | 3000 | NMP/Pyridine (1/5) | 5.64 |
|   |    |      | water | 1.90 |
| 2 | 7 | 3000 | NMP/Pyridine (1/3) | 4.96 |
|   |    |      | water | 2.37 |
| 3 | 13.5 | 3000 | NMP/Pyridine (1/1) | 5.04 |
|   |    |      | water | 2.25 |
| 4 | 12 | 3000 | NMP/Pyridine (2/1) | 8.56 |
|   |    |      | water | 2.43 |

EXAMPLE 26 (COMPARATIVE EXAMPLE 6)

A process having the same reaction conditions as in Example 23 is carried out, but using DMAc as an amide solvent, and LiCl instead of $CaCl_2$. The polymerization time after adding TPC, diameter and shape of the ejection tube are changed as shown in Table 21. The I.V.'s of the resultant pulp-like short fibers are as listed in Table 21.

The, I.V.'s of the resultant pulp-like short fibers in the case where water or ethanol is used as the precipitation solvent shown as a comparison in Table 21. The stir rate was 3,000 rpm.

TABLE 21

| Exp. No. | Polymerization time (min) | Diameter and shape of ejection tube | precipitation | I. V. |
| --- | --- | --- | --- | --- |
| 1 | 8 | 1/8 inch (1 hole) | water | 2.23 |
|   |   |                   | Pyridine | 4.65 |
| 2 | 16 | 1/8 inch (1 hole) | water | 2.53 |
|   |    |                   | Pyridine | 4.92 |
|   |    |                   | DMAc/Pyridine (1/3) | 6.01 |
| 3 | 13 | 1/16 inch (1 hole) | water | 2.40 |
|   |    |                    | Pyridine | 5.72 |
|   |    |                    | DMAc/Pyridine (1/3) | 3.65 |
|   |    |                    | acetone/Pyridine (1/5) | 3.33 |
|   |    |                    | ethanol | 2.45 |

EXAMPLE 27

The conditions of this example are the same as in Example 23 except that the composition of the polymerization solvent and the inorganic salt are changed as described in Table 22.

The measured I.V.'s of the resultant pulp-like short fiber are listed in Table 22.

TABLE 22

| Exp. No. | Polymerication solvent | Inorganic salt | I. V. of the polymer of the LCPD | I. V. of resultant pulp-like short fiber |
| --- | --- | --- | --- | --- |
| 1 | NMP/Pyridine (1% by weight) | $CaCl_2$ | 2.45 | 6.21 |
| 2 | NMP/triethylamine (0.5% by weight) | $CaCl_2$ | 2.39 | 5.94 |
| 3 | DMAc/triethylamine (1% by weight) | LiCl | 2.41 | 5.91 |
| 4 | NMP (70%)/HMPA | $CaCl_2$ | 2.33 | 5.83 |

TABLE 22-continued

| Exp. No. | Polymerization solvent | Inorganic salt | I. V. of the polymer of the LCPD | I. V. of resultant pulp-like short fiber |
|---|---|---|---|---|
| | (30%)/pyridine (0.5% by weight) | | | |

EXAMPLE 28

This example is the third embodiment of the invention. In this example, the LCPD are prepared by the same process as in Example 13, and transferred to mixer. Simultaneously the LCPD and the pyridine from the storage cylinder are transferred to the ejector.

After that, the LCPD and pyridine are ejected at the same time. The temperature is −6° C., the diameter of the ejection orifice is 0.3 mm, the length of that is 3 m, and the ejection speed of the LCPD is 1 m/min, while the ejection speed of pyridine is 30 m/min.

The I.V. of the resultant pulp-like short fiber is 6.5.

EXAMPLE 29

The pulp-like short fiber is prepared under the same reaction conditions as in Example 28 except that the conditions are described in Table 23.

The I.V. of resultant pulp-like short fibers are as listed in Table 23.

TABLE 23

| Exp. No. | Polymerization solvent | Inorganic salt | Precipitation solvent | I. V. of the polymer of the LCPD | I. V. of resultant pulp-like media short fiber |
|---|---|---|---|---|---|
| 1 | NMP | CaCl₂ | Pyridine | 2.1 | 4.9 |
| 2 | NMP | LiCl | Pyridine | 2.35 | 6.52 |
| 3 | NMP | CaCl₂ | Pyridine/CaCl₂ (5% by weight) | 2.35 | 6.52 |
| 4 | DMAc | LiCl | Pyridine | 2.21 | 5.87 |
| 5 | DMAc | CaCl₂ | Pyridine | 2.48 | 7.68 |
| 6 | DMAc | LiCl | Pyridine/Acetone | 2.39 | 4.01 |

EXAMPLE 30

The conditions of this example are the same as in Example 28 with the exception of the I.V. of the polymer of the LCPD and the ejection speed (m/min.) which are changed as shown in Table 24.

The I.V.'s of the resultant pulp-like short fibers are listed in Table 24.

TABLE 24

| Exp. No. | Ejection speed (m/mim) | I.V. of the polymer of the LCPD | I.V. of resultant pulp-like short fiber |
|---|---|---|---|
| 1 | 10 | 2.18 | 4.53 |
| 2 | 20 | 2.53 | 4.81 |
| 3 | 50 | 2.41 | 5.84 |
| 4 | 100 | 2.05 | 6.40 |
| 5 | 500 | 2.23 | 5.90 |
| 6 | 1000 | 2.30 | 7.7 |

EXAMPLE 31

The pulp-like short fiber is prepared under the same conditions as in Example 28. I.V.'s of the polymer of the LCPD and the resultant pulp-like short fibers are measured as the content of the polymer (weight) to polymerization solvent (volume) and changed according to Table 25.

The results were shown in Table 25.

TABLE 25

| Exp. No. | Content (%) | I.V. of the polymer of the LCPD | I.V. of resultant pulp-like short fiber |
|---|---|---|---|
| 1 | 4.5 | 1.90 | 5.61 |
| 2 | 6 | 2.34 | 5.81 |
| 3 | 8 | 2.15 | 6.04 |
| 4 | 10 | 2.41 | 5.73 |
| 5 | 12 | 2.05 | 6.41 |
| 6 | 14 | 2.23 | 7.00 |

COMPARATIVE EXAMPLE 7

In this comparative example, the pulp-like short fiber is prepared under the same conditions as in Example 28 except that the precipitation solvent is changed as shown in Table 26.

TABLE 26

| Exp. No. | Precipitation solvent | I.V. of the polymer of the LCPD | I.V. of resultant pulp-like short fiber |
|---|---|---|---|
| 1 | H₂O | 1.85 | 2.45 |
| 2 | NMP/H₂O (1:1) | 2.07 | 2.58 |
| 3 | methylalcohol | 2.14 | 2.77 |

EXAMPLE 32

This example is the fourth embodiment describing the process for directly preparing aromatic polyamide film by means of extrution.

After a 4-neck flask of 5 l is sufficiently purged with nitrogen gas and then the moisture in the flask is removed as much as possible, 1,200 ml of NMP is introduced into the above flask.

The temperature is raised to 100° C., 27.0 g of CaCl₂ is added and completely dissolved into the solution and also 24.5 g of PPD is dissolved sufficiently in the above solution.

45.95 g of TPC is added while cooling the resulting mixture using an ice bath, and stirring well for 15 minutes with a stir speed of 3,000 rpm in order to produce the LCPD.

The resultant obtained the LCPD is extruded into pyridine through a film die having 25 mm of width and 0.2 mm of lip gap and is simultaneously wound at 20 m/min of the winding speed. The wound film is washed with water and dried to obtain the object aromatic polyamide film having an inherent viscosity (I.V.) of 5.2 ml/g and E/T/Mi of 5.5/22/515.

EXAMPLE 33

The processes for preparing aromatic polyamide film are carried out as discribed in Example 32 except that polymerization solvent, inorganic salts, polymerization accelerating-precipitation solvents and polymerization time are replaced as shown by Table 27.

The resulting I.V.'s and E/T/Mi of the film are listed in following Table 27.

EXAMPLE 34

The processes as described in Example 32 are carried out, except that polymerization solvents and inorganic salts are changed in accordance with Table 28 and pyridine is used as the polymerization accelerating-precipitation solvent.

The results are shown in Table 28.

TABLE 27

| Exp. No. | Polymerization solvent | Inorganic salt | Precipitation solvent | Poly. time (min) | I.V.'s (ml/g) | E/T/Mi |
|---|---|---|---|---|---|---|
| 1 | NMP | CaCl$_2$ | Pyridine | 6.5 | 4.95 | 3.5/19.5/495 |
| 2 | NMP | CaCl$_2$ | Pyridine 50 part/ NMP 50 part/CaCl$_2$ (5 wt %) | 7.5 | 5.22 | 4/22/528 |
| 3 | NMP | CaCl$_2$ | Pyridine 70 part/ DMAC 30 part | 7.0 | 5.51 | 3.5/20/520 |
| 4 | NMP | CaCl$_2$ | Pyridine 30 part/ NMP 70 part | 8.0 | 6.28 | 3.5/23/580 |
| 5 | DMAC | LiCl | Pyridine | 9.0 | 6.11 | 4/21/530 |
| 6 | DMAC | LiCl | Pyridine 67 part/ DMAC 33 part | 7.0 | 5.77 | 4/18/518 |
| 7 | DMAC | LiCl | pyridine 50 part/ NMP 50 part/CaCl$_2$ (8 wt %) | 7.0 | 6.23 | 4.5/21/478 |
| 8 | DMAC | LiCl | pyridine 70 part/ HMPA 30 part | 7.0 | 5.94 | 4.5/23/510 |

TABLE 28

| Exp. No. | Polymerization solvent | Inorganic salt | Polymerization time (min) | I.V. (ml/g) | E/T/Mi |
|---|---|---|---|---|---|
| 1 | NMP/pyridine (0.5 wt %) | CaCl$_2$ | 9.0 | 5.33 | 3/20/530 |
| 2 | NMP/pyridine (1.0 wt %) | CaCl$_2$ | 8.0 | 6.21 | 4/19/525 |
| 3 | NMP/pyridine (2.5 wt %) | CaCl$_2$ | 7.0 | 5.94 | 3.5/21/525 |
| 4 | DMAC/pyridine (2.0 wt %) | LiCl | 7.0 | 5.69 | 3.5/23/540 |
| 5 | NMP (1080 ml)/ HMPA (120 ml)/ pyridine (1.0 wt %) | CaCl$_2$ | 8.0 | 5.81 | 3.0/24/540 |
| 6 | NMP (1080 ml)/ DMAC (120 ml)/ pyridine (1.0 wt %) | LiCl | 8.0 | 6.00 | 4/18/518 |

EXAMPLE 35

130 ml of NMP and 20 ml of DMAc are introduced into a dry 1 l 4-neck flask. After dissolving the mixture, 6.3 g of CaCl$_2$ and 4.0 g of PPD are added and completely dissolved. 9.19 g of TPC is added while stirring. The temperature during the polymerization is controlled by circulating cooling water, and is maintained at 40° C.

After the resulting solution is stirred for approximately 10 minutes, the LCPD is drawn into pyridine through an film die having a width of 25 mm and lip gap of 0.5 mm, and is wound with a winding speed of 30 m/min. The resultant film is washed with water and dried.

The I.V. of the film was 4.9 and E/T/Mi of 3/22/450.

EXAMPLE 36

The aromatic polyamide film are prepared by the same process as in Example 35, except that the drawing ratio are adjusted in accordance with Table 29.

The results are shown in Table 29.

TABLE 29

| Exp. No. | drawing ratio | I.V. (ml/g) | E/T/Mi |
|---|---|---|---|
| 1 | 2.0 | 4.69 | 2.5/18/470 |
| 2 | 3.0 | 5.23 | 3.5/20/480 |
| 3 | 4.0 | 5.29 | 3.5/22/520 |

EXAMPLE 27

The aromatic polyamide film are prepared by the same process as in Example 36, except that the lip gap are substituted as in accordance with Table 30.

The results are shown in Table 30.

TABLE 30

| Exp. No. | lip gap (mm) | drawing ratio | I.V. (ml/g) | E/T/Mi |
|---|---|---|---|---|
| 1 | 0.2 | 3.0 | 6.27 | 2.5/23/590 |
| 2 | 0.5 | 3.0 | 5.33 | 2.5/23/580 |
| 3 | 0.7 | 3.0 | 5.11 | 2.5/20/515 |
| 4 | 1.0 | 3.0 | 4.92 | 3/18/470 |
| 5 | 3.0 | 3.0 | 4.80 | 4/18/450 |

EXAMPLE 38

This example is the fifth embodiment of the invention.

After a 4-neck flask of 5 l is sufficiently purged with nitrogen gas and then the moisture in the flask is removed as much as possible, 1,200 ml of NMP is introduced into the above flask.

The temperature is raised to 100° C., 27.0 g of CaCl$_2$ is added and completely dissolved into the solution and also 24.5 g of PPD is dissolved sufficiently in the above solution.

45.95 g of TPC is added while cooling the resulting mixture using an ice bath, and stirring well for 15 minutes with a stirring speed of 3,000 rpm in order to produce the LCPD.

The resultant obtained the LCPD is supplied to a endless belt with a belt speed of 30 m/min and passed through between the shear knife and the surface of the endless belt. The polymer solution obtained in the form of film is contacted with pyridine and is simultaneously wound at 30 m/min of the winding speed. Then the shear rate provided to the polymer solution is approx 2,000 sec$^{-1}$. The wound film is washed with water and dried to obtain the object aromatic polyamide film having an inherent viscosity (I.V.) of 5.5 ml/g and E/T/Mi of 4/23/503.

EXAMPLE 39

The processes for preparing aromatic polyamide film are carried out as discribed in Example 38 except that polymerization solvent, inorganic salts, polymerization accelerating-precipitation solvents and polymerization time are replaced as shown by Table 31.

The results are shown in Table 31.

EXAMPLE 40

The processes as described in Example 38 are carried out, except that polymerization solvents and inorganic salts are changed in accordance with Table 32 and pyridine is used as the polymerization accelerating-precipitation solvent.

The results are shown in Table 32.

EXAMPLE 41

The aromatic polyamide film are prepared by the same process as in Example 38 except that the polymerization solvent and polymerization accelerating-precipitation solvent are replaced and the gap are adjusted in accordance with Table 33.

The results are shown in Table 33.

TABLE 31

| Exp. | polymerization solvents | inorganic salts | precipitation solvent | polymerization time (min) | I.V. (ml/g) | E/T/Mi |
|---|---|---|---|---|---|---|
| 1 | NMP | CaCl$_2$ | pyridine | 9.0 | 4.74 | 4.4/23/510 |
| 2 | NMP | CaCl$_2$ | pyridine 50 part/ NMP 50 part/ CaCl$_2$ (5 wt %) | 10.0 | 5.96 | 4/22/528 |
| 3 | NMP | CaCl$_2$ | pyridine 30 part/ DMAC 70 part | 8.5 | 6.02 | 3.5/20/520 |
| 4 | NMP | CaCl$_2$ | pyridine 70 part/ NMP 30 part | 8.0 | 6.28 | 3.5/20/480 |
| 5 | DMAC | LiCl | pyridine | 9.0 | 6.51 | 4/21/530 |
| 6 | DMAC | LiCl | pyridine 67 part/ DMAC 33 part | 8.0 | 4.78 | 3.5/19/492 |
| 7 | DMAC | LiCl | pyridine 30 part/ NMP 70 part/ CaCl$_2$ (8 wt %) | 8.0 | 5.33 | 3.5/23/580 |
| 8 | DMAC | LiCl | pyridine 50 part/ HMPA 50 part | 8.0 | 4.67 | 4/18/518 |

TABLE 32

| Exp. | polymerization solvent | inorganic salt | polymerization time (min) | I.V. (ml/g) | E/T/Mi |
|---|---|---|---|---|---|
| 1 | NMP/pyridine (0.5 wt %) | CaCl$_2$ | 9.0 | 5.93 | 3/22/570 |
| 2 | NMP/pyridine (1.5 wt %) | CaCl$_2$ | 8.0 | 6.15 | 3/21/545 |
| 3 | NMP/pyridine (2.5 wt %) | CaCl$_2$ | 7.0 | 6.34 | 3.5/19/465 |
| 4 | DMAC/pyridine (1.0 wt %) | LiCl | 8.0 | 5.96 | 4/18/480 |
| 5 | NMP (1000 ml)/HMPA (200 ml)/ pyridine (1.0 wt %) | CaCl$_2$ | 8.0 | 5.14 | 3.5/21/520 |
| 6 | NMP (1000 ml)/DMAC (200 ml)/ pyridine (1.0 wt %) | LiCl | 8.0 | 6.02 | 4/20/508 |

TABLE 30

| EXP. NO. | gap (mm) | I.V. (ml/g) | E/T/Mi |
|---|---|---|---|
| 1 | 0.2 | 6.78 | 2.5/24/570 |
| 2 | 0.5 | 5.95 | 2.5/21/540 |
| 3 | 0.7 | 5.38 | 3/19/515 |
| 4 | 1.0 | 5.14 | 3/19/470 |
| 5 | 3.0 | 4.97 | 4/18/450 |

EXAMPLE 42

The aromatic polyamide film are parpared by the same process as in Example 38, except that the shear rate is adjusted in accordance with Table 34.

The results are shown in Table 34.

TABLE 34

| EXP. NO. | shear rate (sec$^{-1}$) | I.V. (ml/g) | E/T/Mi |
|---|---|---|---|
| 1 | 30 | 5.91 | 4/16/370 |
| 2 | 200 | 5.95 | 3.5/19/470 |
| 3 | 1500 | 6.02 | 3/22/535 |
| 4 | 7000 | 6.01 | 2.5/23/560 |
| 5 | 12000 | 6.15 | 2.5/24/570 |

What is claimed is:

1. A process for preparing aromatic polyamide in the form of film which process comprises:
    (a) preparing a mixture by adding equivalent moles of an aromatic diamine and an aromatic diacidchloride reactant to a first solvent, which is an amide polymerization solvent containing an inorganic salt;
    (b) dissolving said diamine and said diacidchloride in said first solvent;
    (c) effecting a partial polymerization at a low temperature of the dissolved reactants to form an optically anisotropic liquid crystalline prepolymer dope having an amount of polymer and an inherent viscosity suitable for forming film therefrom;
    (d) continuously extruding through a film die said prepolymer dope into a second solvent, which is a polymerization accelerating-precipitation solvent, under a drawing ratio of 1 to 4; and
    (e) obtaining aromatic polyamide film free of a crystal defect layer perpendicular to the film axis and having a high strength and a high degree of molecular orientation.
2. A process for preparing aromatic polyamide in the form of film which process comprises:
    (a) preparing a mixture by adding equivalent moles of an aromatic diamine and an aromatic diacidchloride reactant to a first solvent, which is an amide polymerization solvent containing an inorganic salt;

(b) dissolving said diamine and said diacidchloride in said first solvent;

(c) effecting a partial polymerization at a low temperature of the dissolved reactants to form an optically anisotropic liquid crystalline prepolymer dope having an amount of polymer and an inherent viscosity suitable for forming film therefrom;

(d) contacting a said prepolymer dope with a second solvent, which is a polymerization accelerating-precipitation solvent, after subjecting to shear in a shear rate of at least 20 sec$^{-1}$ on the surface of an endless belt, (e) obtaining aromatic polyamide film free of a crystal defect layer perpendicular to the film axis and having a high strength and a high degree of molecular orientation.

3. The process according to claim 1 or 2, wherein said prepolymer dope is formed just before gelation and after stir opalescence occurs during the polymerization reaction.

4. The process according to claim 1 or 2, wherein said prepolymer dope is in the form of a co-polymer or a homo-polymer.

5. The process according to claim 1 or 2, wherein said first amide polymerization solvent further contains a small amount of tertiary amine.

6. The process according to claim 1 or 2, wherein said first solvent contains a tertiary amine in an amount of between 0.01 and 2% by weight of said first amide polymerization solvent for adjusting the polymerization reaction rate.

7. The process according to claim 1 or 2, wherein said first amide polymerization solvent comprises at least one member of the group consisting of N-methyl-2-pyrrolidone, N,N-dimethylacetamide, hexamethylphosphoramide, N,N-dimethylformamide, dimethysulfoxide, N,N,N',N'-tetramethylurea, N-methylpiperidone, N-methylcaprolactam, N-acetylpyrrolidine, N-ethylpyrrolidine, N,N-dimethylpropionamide, and N,N-dimethyl isobutylamide.

8. The process according to claim 1 or 2, wherein said second solvent is selected from the group consisting of a tertiary amine, a mixture of a tertiary amine and an amide and a mixture of either of the above with an inorganic salt.

9. The process according to claim 8, wherein the tertiary amine is a member selected from the group consisting of pyridine, quinoline, triethylamine, t-butylamine, picoline, pyrimidine, pyrazine quinoxaline, quinuclidine, and dimethylethylamine.

10. The process according to claim 9, wherein the tertiary amine is pyridine.

11. The process according to claim 8, wherein said second solvent is a mixture of the amine and an amide, and the amide is 10 to 90% by volume of the tertiary amine.

12. The process according to claim 11, wherein the amide is a member selected from the group consisting of N-methyl-2-pyrrolidone, N,N-dimethylacetamide, hexamethylphosphoramide, N,N-dimethylformamide, dimethylsulfoxide, N,N,N',N'-tetramethylurea, N-methylpiperidone, N-methylcaprolactam, N-acetylpyrrolidine, N-ethylpyrrolidine, N,N-dimethylpropionamide, and N,N-dimethylisobutylamide.

13. The process according to claim 8, wherein the inorganic salt is 0.01 to 10% by weight of the second solvent.

14. The process according to claim 13, wherein the inorganic salt is a member selected from the group consisting of CaCl$_2$, KCl, LiCl, KBr and LiBr.

15. The process according to claim 1 or 2, wherein the inherent viscosity of the polymer of the prepolymer dope ranges from 1.0 to 4.0.

16. The process according to claim 15, wherein the inherent viscosity of the prepolymer dope ranges from 1.5 and 3.5.

17. The process according to claim 1 or 2, wherein the time during which the prepolymer dope contacts the second solvent ranges from 0.1 to 1,000 seconds.

* * * * *

UNITED STATES PATENT AND TRADEMARK OFFICE
CERTIFICATE OF CORRECTION

PATENT NO. : 4,971,744
DATED : November 20, 1990
INVENTOR(S) : Ho J. Park, Moo S. Rhim, Hak M. Kim,
Du H. Kim, Seog C. Yoo, Sang H. Kim et al.

It is certified that error appears in the above-identified patent and that said Letters Patent is hereby corrected as shown below:

ON TITLE PAGE: Item [75]

Third line after "Inventors:" change
"Seog O. Yoo" to --Seog C. Yoo--.

Signed and Sealed this

Twenty-third Day of June, 1992

Attest:

DOUGLAS B. COMER

*Attesting Officer*           *Acting Commissioner of Patents and Trademarks*